US011289951B2

United States Patent
Ha et al.

(10) Patent No.: US 11,289,951 B2
(45) Date of Patent: Mar. 29, 2022

(54) ELECTRONIC DEVICE AND METHOD FOR WIRELESSLY TRANSMITTING POWER BASED ON FOREIGN OBJECT DETECTION IN THE ELECTRONIC DEVICE

(71) Applicant: Samsung Electronics Co., Ltd., Suwon-si (KR)

(72) Inventors: Mincheol Ha, Suwon-si (KR); Dongzo Kim, Suwon-si (KR); Kwangseob Kim, Suwon-si (KR); Kihyun Kim, Suwon-si (KR); Jihye Kim, Suwon-si (KR); Yunjeong Noh, Suwon-si (KR); Jungsu Park, Suwon-si (KR); Kyungmin Lee, Suwon-si (KR); Woojin Jung, Suwon-si (KR); Yongsang Yun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 92 days.

(21) Appl. No.: 16/711,262

(22) Filed: Dec. 11, 2019

(65) Prior Publication Data
US 2020/0266670 A1    Aug. 20, 2020

(30) Foreign Application Priority Data
Feb. 19, 2019    (KR) .................. 10-2019-0019177

(51) Int. Cl.
*H02J 50/60* (2016.01)
*H02J 50/10* (2016.01)
*H02J 7/00* (2006.01)

(52) U.S. Cl.
CPC ............. *H02J 50/60* (2016.02); *H02J 7/007* (2013.01); *H02J 50/10* (2016.02)

(58) Field of Classification Search
CPC ....................................... H02J 50/60
(Continued)

(56) References Cited

U.S. PATENT DOCUMENTS

| 8,446,046 B2 | 5/2013 | Fells et al. |
| 9,553,485 B2 | 1/2017 | Singh et al. |

(Continued)

FOREIGN PATENT DOCUMENTS

| KR | 10-2017-0135492 A | 12/2017 |
| KR | 10-1812444 B1 | 12/2017 |
| WO | 2018/093099 A1 | 5/2018 |

OTHER PUBLICATIONS

European Search Report dated May 8, 2020 in connection with European Patent Application No. 20 15 8077, 10 pages.
(Continued)

*Primary Examiner* — Edward Tso
*Assistant Examiner* — Ahmed H Omar

(57) ABSTRACT

An electronic device including a coil, a power transmission circuit electrically connected with the coil, a detection circuit, and a control circuit. The control circuit of the electronic device configured to wirelessly output a first signal for identifying an access of a foreign object by first period intervals through the coil using the power transmission circuit, identify a change of the first signal using the detection circuit, wirelessly output the first signal by the first period intervals in response to a detection value of the changed first signal being less than or equal to a first threshold value, and wirelessly output the first signal by a second period intervals longer than the first period intervals in response to the detection value of the changed first signal exceeding the first threshold value.

20 Claims, 13 Drawing Sheets

(58) Field of Classification Search
USPC .......................................................... 320/108
See application file for complete search history.

(56) References Cited

U.S. PATENT DOCUMENTS

| | | |
|---|---|---|
| 2012/0293007 A1 | 11/2012 | Byun et al. |
| 2013/0257168 A1 | 10/2013 | Singh |
| 2014/0266036 A1 | 9/2014 | Jung et al. |
| 2015/0341087 A1 | 11/2015 | Moore et al. |
| 2017/0331334 A1 | 11/2017 | Park |
| 2018/0034305 A1 | 2/2018 | Lee et al. |
| 2018/0375385 A1 | 12/2018 | Li et al. |
| 2019/0148987 A1 | 5/2019 | Jung |
| 2019/0280534 A1 | 9/2019 | Park |
| 2019/0319494 A1* | 10/2019 | Park ........................ H02J 50/60 |
| 2020/0204009 A1* | 6/2020 | Park ........................ H02J 50/80 |

OTHER PUBLICATIONS

International Search Report dated May 22, 2020 in connection with International Patent Application No. PCT/KR2020/001968, 4 pages.
Written Opinion of the International Searching Authority dated May 22, 2020 in connection with International Patent Application No. PCT/KR2020/001968, 4 pages.

* cited by examiner

ELECTRONIC DEVICE AND METHOD FOR WIRELESSLY TRANSMITTING POWER BASED ON FOREIGN OBJECT DETECTION IN THE ELECTRONIC DEVICE

CROSS-REFERENCE TO RELATED APPLICATION

This application is based on and claims priority under 35 U.S.C. § 119 to Korean Patent Application No. 10-2019-0019177 filed on Feb. 19, 2019 in the Korean Intellectual Property Office, the disclosure of which is incorporated by reference herein in its entirety.

BACKGROUND

1. Field

Various embodiments of the disclosure relate to an electronic device and a method for wirelessly transmitting power.

2. Description of Related Art

Wireless charging or non-contact charging technologies have been developed and have been recently used for many electronic devices. Such wireless charging technologies employ wireless power transmission/reception and may be a technology in which power is wirelessly transferred to a power reception device from a power transmission device to charge a battery of the power reception device, without connection between the power reception device and the power transmission device through a separate charging connector. A mobile electronic device such as a smartphone, a tablet personal computer (PC), etc., may include a battery therein. The battery may be charged through a wired connector connected with the electronic device. Recently, there have been used technologies for wirelessly supplying power from the power transmission device to the electronic device without connection of a wired connector.

According to the wireless charging technology, power is transmitted without physical connection between a wireless power transmission device (e.g., an electronic device) and a wireless power reception device (e.g., an external electronic device), such that when a foreign object or an external object (e.g., a metallic material) exists between the wireless power transmission device and the wireless power reception device during wireless charging, the efficiency of power transmission/reception may be lowered by the foreign object and heat generation may occur due to induction heating caused by the foreign object.

The wireless charging technology may include a foreign object detection (FOD) function that detects a foreign object between the wireless power transmission device and the wireless power reception device to stop power transmission therebetween upon detection of the foreign object.

For example, the foreign object between the wireless power transmission device and the wireless power reception device may be detected based on a difference between power transmitted from the wireless power transmission device and power received by the wireless power reception device. Such a conventional external object detection technology performs detection after actual power transmission between the wireless power transmission device and the wireless power reception device, such that when the wireless power reception device is not located in proximity to the wireless power transmission device, a foreign object in the wireless power transmission device may not be detected.

The wireless power transmission device has standby power even before the wireless power reception device is located in proximity thereto, such that heat may be produced in the wireless power transmission device due to induction heating caused by the standby power when a foreign object such as metal, etc., exists in the presence of the standby power.

The above information is presented as background information only to assist with an understanding of the present disclosure. No determination has been made, and no assertion is made, as to whether any of the above might be applicable as prior art with regard to the present disclosure.

SUMMARY

According to various embodiments of the disclosure, there is provided an electronic device capable of reducing heat production caused by a foreign object by monitoring standby power before transmission of actual power to be transmitted from an external electronic device and a method for transmitting power based on foreign object detection in the electronic device.

According to various embodiments of the disclosure, there is provided an electronic device capable of reducing heat generation caused by a foreign object by changing a ping period (or ping period interval) when the foreign object exists as a result of standby power monitoring in a ping signal output state and a method for transmitting power based on foreign object detection in the electronic device.

According to various embodiments of the disclosure, there is provided an electronic device allowing power supply to be flexibly stopped by lowering a threshold value related to stop of wireless power transmission in an actual power transfer phase (e.g., a power transfer phase) while enabling wireless power transmission even when a foreign object exists as a result of standby power monitoring and a method for transmitting power based on foreign object detection in the electronic device.

According to various embodiments of the disclosure, there is provided an electronic device capable of minimizing heat generation by lowering a transmission power magnitude designated in relation to a high-speed charging mode while enabling wireless power transmission even in the presence of a foreign object, when charging has to be performed in the high-speed charging mode in the presence of the foreign object as a result of standby power monitoring, and a method for transmitting power based on foreign object detection in the electronic device.

According to various embodiments of the disclosure, an electronic device includes a coil, a power transmission circuit electrically connected with the coil, a detection circuit, and a control circuit, in which the control circuit is configured to wirelessly output a first signal for identifying an access of a foreign object by first period intervals (or every first periods) through the coil (or periodically output the first signal by a first period), by using the power transmission circuit, identify a change of the first signal, by using the detection circuit, wirelessly output the first signal by the first period intervals, when a detection value of the changed first signal is less than or equal to a first threshold value, and wirelessly output the first signal by a second period intervals longer than the first period intervals, when the detection value of the changed first signal exceeds the first threshold value. According to various embodiments of the disclosure, an electronic device includes a coil, a power transmission circuit electrically connected with the coil, a detection circuit, and a control circuit, in which the control circuit is configured to wirelessly output a ping signal by first period intervals (or every first period) through the coil by using the power transmission circuit, to identify presence or absence of a foreign object, based on a change of the ping signal, detected using the detection circuit, to change a magnitude of a power signal wirelessly transmitted to an external electronic device, based on the presence or absence of the foreign object, and transmit the power signal with the changed magnitude through the power transmission circuit, upon receiving a response signal corresponding to the ping signal from the external electronic device.

According to various embodiments of the disclosure, a method for wirelessly transmitting power based on foreign object detection in an electronic device includes wirelessly outputting a first signal for identifying an access of a foreign object by first period intervals (or every first period) through a coil, by using a power transmission circuit, identifying a change of the first signal, by using a detection circuit; and controlling the power transmission circuit based on the detection value of the changed first signal, wherein when a detection value of the changed first signal is less than or equal to a first threshold value, the power transmission circuit is controlled to maintain wirelessly outputting the first signal by the first period intervals, and when a detection value of the changed first signal exceeds the first threshold value, the power transmission circuit is controlled to wirelessly output the first signal by a second period intervals longer than the first period intervals, when the detection value of the changed first signal exceeds the first threshold value.

According to various embodiments of the disclosure, in a storage medium having stored therein instructions, the instructions are configured to, when executed by at least one circuit, cause the at least one circuit to perform at least one operation including wirelessly transmitting power based on foreign object detection in an electronic device includes wirelessly outputting a first signal for identifying an access of a foreign object by first period intervals (or every first period) through a coil, by using a power transmission circuit, identifying a change of the first signal, by using a detection circuit; and controlling the power transmission circuit based on the detection value of the changed first signal, wherein when a detection value of the changed first signal is less than or equal to a first threshold value, the power transmission circuit is controlled to maintain wirelessly outputting the first signal by the first period intervals, and when a detection value of the changed first signal exceeds the first threshold value, the power transmission circuit is controlled to wirelessly output the first signal by a second period intervals longer than the first period intervals, when the detection value of the changed first signal exceeds the first threshold value.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be disclosed with reference to the accompanying drawings.

Figure 1:
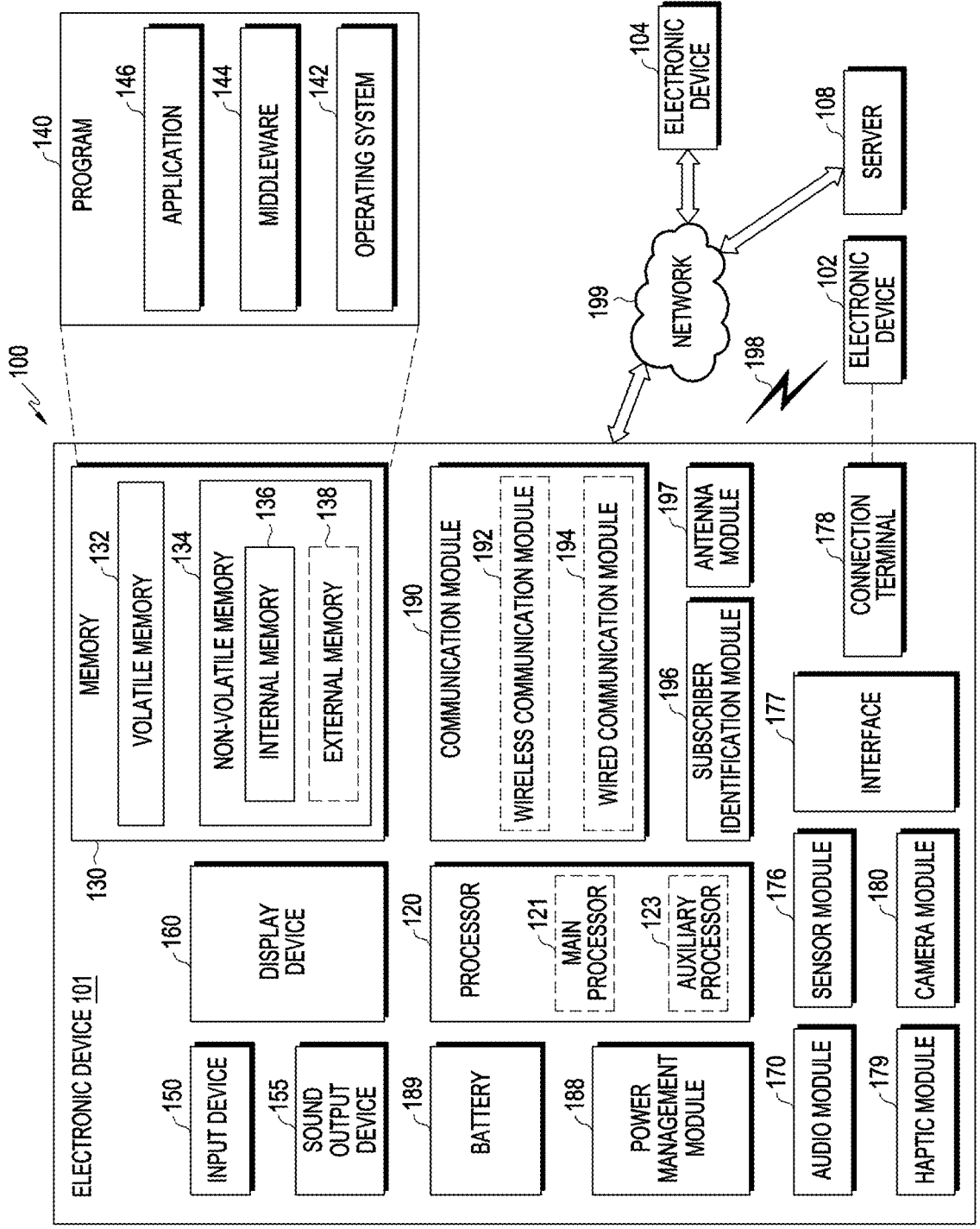
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)) and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
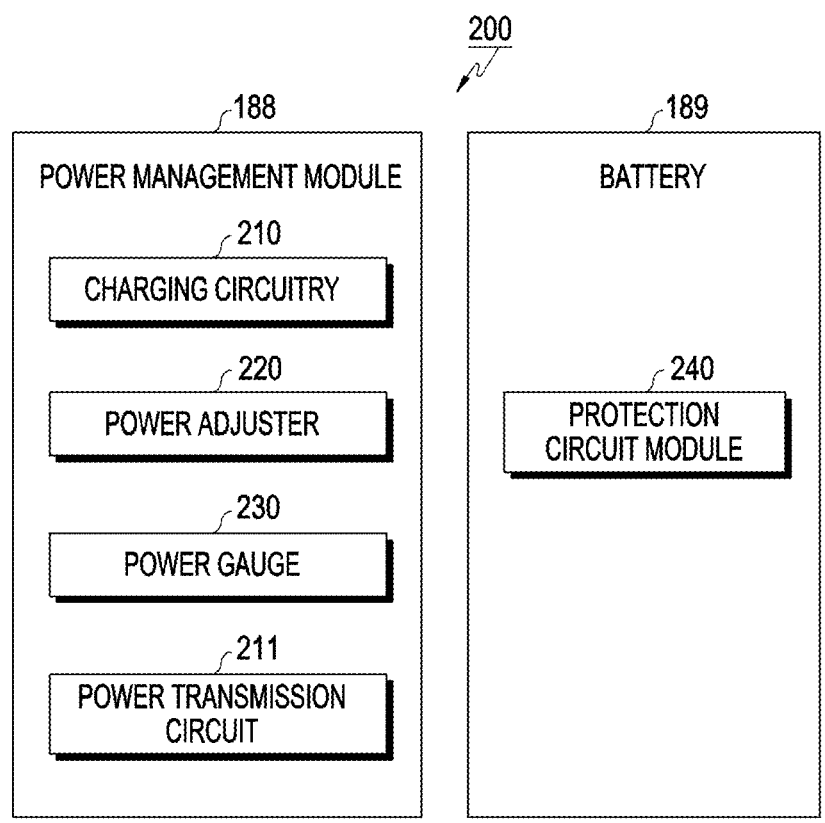
FIG. 2 illustrates a block diagram of a power management module and a battery, according to various embodiments.

FIG. 2 is a block diagram 200 illustrating the power management module 188 and the battery 189 according to various embodiments.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to be abnormal, the power management module 188 may adjust the charging of the battery 189 (e.g., reduce the charging current or voltage or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 276, the power gauge 230, or the power management module 188. According to an embodiment, the corresponding sensor (e.g., a temperature sensor) of the sensor module 176 may be included as part of the PCM 240 or may be disposed near the battery 189 as a separate device.

According to an embodiment, the power management module 188 may further include a power transmission circuit 211. The power transmission circuit 211 may include a power adaptor that receives input of a power source (or power) from the battery 189 and properly converts a voltage of the input power, a power production circuit that produces power, and/or a matching circuit for wirelessly transmitting the produced power to an external electronic device (e.g., the electronic device 102 of FIG. 1). The power transmission circuit 211 may transmit the produced power to the external electronic device by maximizing efficiency between a transmission coil and a reception coil of the external electronic device through the matching circuit.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
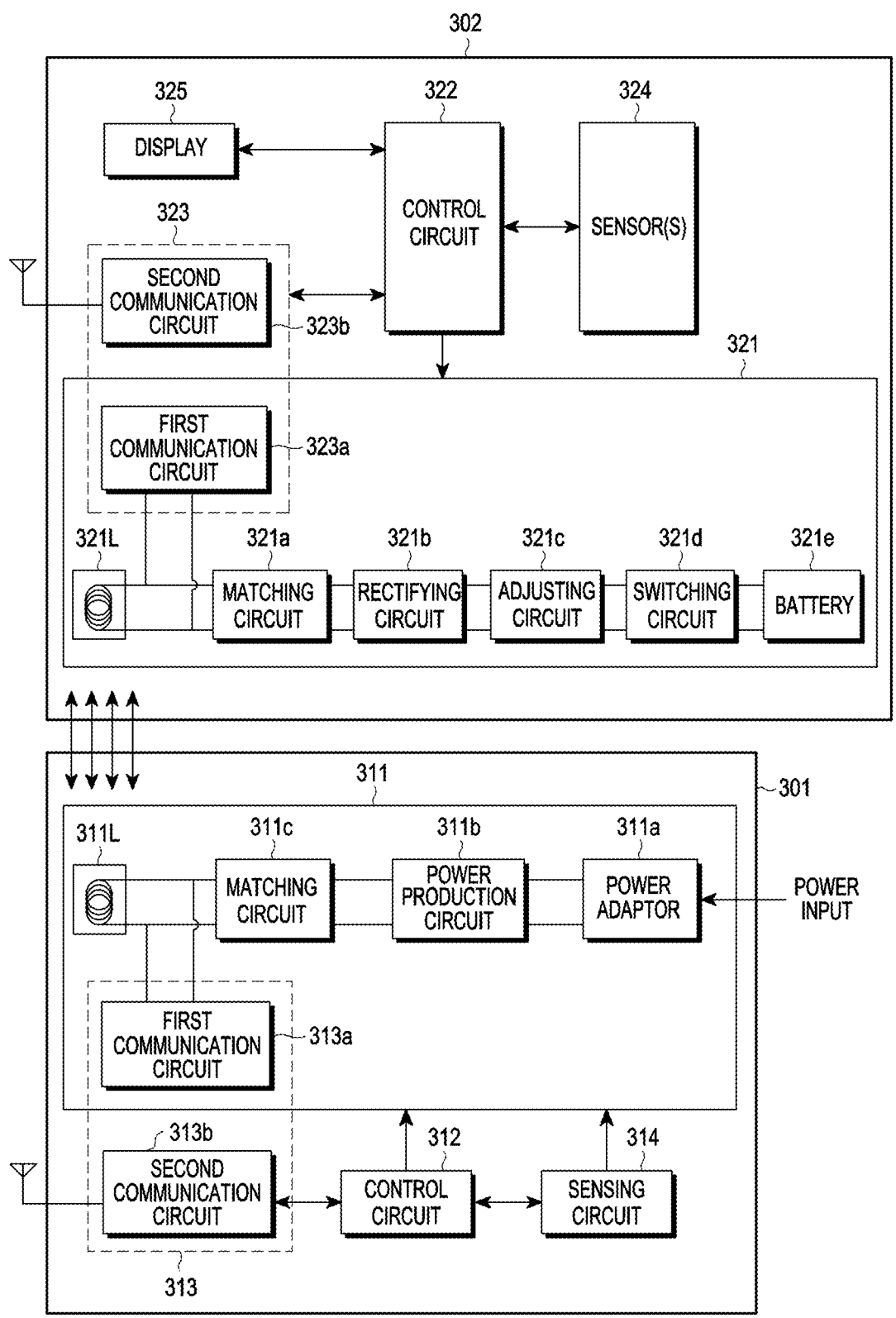
FIG. 3 illustrates a wireless charging system according to various embodiments.

FIG. 3 illustrates a wireless charging system according to various embodiments.

Referring to FIG. 3, according to an embodiment of the disclosure, a power transmission device 301 (or an electronic device) may wirelessly supply power to a power reception device 302 (or an external electronic device), and the power reception device 302 may wirelessly receive power. According to an embodiment of the disclosure, the power transmission device 301 may include the entire electronic device 101 of FIG. 1 or at least a part thereof, and the entire power management module 188 of FIG. 2 or at least a part thereof. According to an embodiment of the disclosure, the power reception device 302 may include the entire external electronic device 102 of FIG. 1 or at least a part thereof, and the entire power management module 188 of FIG. 2 or at least a part thereof.

According to an embodiment of the disclosure, the power transmission device 301 may include a power transmission circuit 311 (e.g., the power transmission circuit 211 of FIG. 2), a control circuit 312 (e.g., the processor 120 of FIG. 1), a communication circuit 313 (e.g., the communication module 190 of FIG. 1), and/or a sensing circuit (or detection circuit) 314 (e.g., the sensor module 176 of FIG. 1).

According to an embodiment of the disclosure, the power transmission circuit 311 may include a power adaptor 311a that receives input of a power source (or power) from an external source and properly converts a voltage of the input power source, a power production circuit 311b that produces power, and/or a matching circuit 311c that maximizes efficiency between a transmission coil 311L and a reception coil 321L.

According to an embodiment of the disclosure, the control circuit 312 may perform overall control over the power transmission device 301, generate various messages required for wireless power transmission, and deliver them to the communication circuit 313. According to an embodiment of the disclosure, the control circuit 312 may calculate power (or a power quantity or a power magnitude) to be output to the power reception device 302 based on information received from the communication circuit 313. In an embodiment of the disclosure, the control circuit 312 may control the power transmission circuit 311 to transmit the power calculated by the transmission coil 311L to the power reception device 302. The control circuit 312 according to an embodiment of the disclosure may be configured to wirelessly output a signal through the transmission coil 311L by using the power transmission circuit 311. According to an embodiment of the disclosure, the control circuit 312 may output a first signal for identifying an access of a foreign object or a second signal for wireless power transmission. For example, for wireless power transmission, through the transmission coil 311L, the control circuit 312 may output the first signal for identifying an access of a foreign object (hereinafter, referred to as a ping signal) by first period intervals (e.g., every designated period or every first period) in a ping phase (e.g., a standby power state), output a signal related to authentication in an identification & configuration phase, and output the second signal for power transmission (hereinafter, referred to as a power signal) in a power transfer phase. According to an embodiment of the disclosure, the power signal may be a signal corresponding to power provided as power (or a power quantity or a power magnitude) to be output to the power reception device 302 is calculated. For example, the power signal may be a signal corresponding to power provided as power to be output through transmission/reception of a control error packet (CEP) signal and a received error packet (RPP) signal between the power transmission device 301 and the power reception device 302.

According to an embodiment of the disclosure, the control circuit 312 may wirelessly output a ping signal every first period (e.g., 550 ms) through the transmission coil 311L by using the power transmission circuit 311. According to an embodiment of the disclosure, when the foreign object (a substance capable of generating heat due to an electrical signal, a metallic substance, etc.) exists in the position corresponding to the transmission coil 311L or near the transmission coil 311L (e.g., the position on the charging pad where the external electronic device is placed), heat may be generated in the foreign object, the transmission coil 311L, the position corresponding to the transmission coil 311L, and/or around the transmission coil 311L due to induction heating caused by the foreign object. For example, induction heating may be more likely to occur due to the foreign object caused by a ping signal having a short time interval period (e.g., a high frequency) than a ping signal having a long time interval period (e.g., a low frequency).

According to an embodiment of the disclosure, the control circuit 312 may identify a change of the output ping signal by using the sensing circuit 314, such that the control circuit 312 may maintain the first period, when a detection value of the changed ping signal is less than or equal to a first threshold value, and may change the first period into a second period (e.g., 2000 ms) that is longer than the first period, when the detection value of the changed ping signal exceeds the first threshold value. For example, the first threshold value may be a current threshold value or a voltage threshold value.

According to an embodiment of the disclosure, the control circuit 312 may change the first period into the second period that is longer than the first period upon failing to receive a response signal corresponding to the ping signal from the power reception device 302, when the detection value of the changed ping signal exceeds the first threshold value. For example, the control circuit 312 may change the first period into the second period that is longer than the first period upon failing to receive a response signal corresponding to the ping signal from the power reception device 302, when an electric current detection value of the changed ping signal exceeds the first threshold value or a voltage detection value of the changed ping signal exceeds the first threshold value.

According to an embodiment of the disclosure, the control circuit 312 may determine (or identify) that the foreign object (a substance capable of generating heat due to an electrical signal, a metallic substance, etc.) exists in the position corresponding to the transmission coil 311L or near the transmission coil 311L (e.g., the position on the charging pad where the external electronic device is placed), upon failing to receive the response signal corresponding to the ping signal from the power reception device 302 when the detection value of the changed first signal exceeds the first threshold value. According to an embodiment of the disclosure, the control circuit 312 may determine (or identify) that a foreign object (a substance capable of generating heat due to an electrical signal, a metallic substance, etc.) exists in a position corresponding to the transmission coil 311L or near the transmission coil 311L (e.g., a position on a charging pad where the external electronic device is placed), upon failing to receive a response signal corresponding to the ping signal from the power reception device 302 when an electric current detection value of the changed first signal exceeds a first electric current threshold value. For example, the control circuit 312 may detect an electric current value $I_{ping}$ of a ping signal a plurality of times and determine (or identify) that a foreign object (a substance capable of generating heat due to an electrical signal, a metallic substance, etc.) exists in a position corresponding to the transmission coil 311L or near the transmission coil 311L (e.g., a position on a charging pad where the external electronic device is placed) when the detected current value $I_{ping}$ exceeds a first electric current threshold value $I_{ping}$ Threshold (e.g., 150 mA). According to an embodiment of the disclosure, the control circuit 312 may determine (or identify) that a foreign object other than the power reception device 302 exists, upon failing to receive a response signal corresponding to the ping signal from the power reception device 302, when the voltage detection value of the changed ping signal exceeds a first voltage threshold value. For example, the control circuit 312 may detect a voltage value $V_{ping}$ of a ping signal a plurality of times, and determine (or identify) that a foreign object (a substance capable of generating heat due to an electrical signal, a metallic substance, etc.) exists in a position corresponding to the transmission coil 311L or near the transmission coil 311L (e.g., a position on a charging pad where the external electronic device is placed) when the detected voltage value $V_{ping}$ exceeds a first voltage threshold value $V_{ping}$ Threshold a designated number of times (e.g., three times) or more.

According to an embodiment of the disclosure, the response signal corresponding to the ping signal may be a signal strength packet (SSP) signal.

According to an embodiment of the disclosure, the control circuit 312 may change a threshold value related to stop of output of a power signal for wireless power transmission, when identifying that the foreign object other than the power reception device 302 exists.

According to various embodiments of the disclosure, the threshold value related to stop of output of the power signal for wireless power transmission may be a foreign object detection (FOD) threshold value. According to an embodiment of the disclosure, the FOD threshold value may be a threshold value of a difference between a transmission power transmitted from the power transmission device 301 and a reception power received by the power reception device 302. According to various embodiments of the disclosure, the FOD threshold value may be designated to (or changed into) one of a plurality of threshold values (e.g., a second threshold value, a third threshold value, a fourth threshold value, or a fifth threshold value) based on a ping period of the power transmission device 301 and the power reception device 302 or a charging mode.

According to various embodiments of the disclosure, the FOD threshold value may be the second threshold value (e.g., 1300 mW) when the ping signal has a first period (550 ms) and the charging mode is a normal charging mode, and the FOD threshold value may be the third threshold value (e.g., 560 mW) when the ping signal has a second period (2000 ms) and the charging mode is the normal charging mode. According to various embodiments of the disclosure, the FOD threshold value may be the fourth threshold value (e.g., 2600 mW) when the ping signal has the first period (550 ms) and the charging mode is a high-speed charging mode. According to various embodiments of the disclosure, the FOD threshold value may be the fifth threshold value (e.g., 1300 mW) when the ping signal has the second period (2000 ms) and the charging mode is the high-speed charging mode.

The control circuit 312 may receive information about received power from the power reception device 302 after transmitting the power signal, to identify the difference between the transmission power and the reception power. The control circuit 312 may stop transmitting the power signal for wireless power transmission when the difference between the transmission power and the reception power exceeds the designated or changed FOD threshold value (e.g., the second threshold value, the third threshold value, the fourth threshold value, or the fifth threshold value).

According to an embodiment of the disclosure, when wirelessly outputting the power signal to the power reception device 302 in a state where the detection value of the ping signal is less than or equal to the first threshold value (e.g., in the absence of the foreign object), the control circuit 312 may stop outputting the power signal when a detection value of the power signal detected by the sensing circuit 314 exceeds the threshold value related to stop of wireless power transmission. According to an embodiment of the disclosure, when wirelessly outputting the power signal to the power reception device 302 in a state where the detection value of the ping signal exceeds the first threshold value (e.g., in the presence of the foreign object), the control circuit 312 may stop outputting the power signal when the detection value of the power signal detected by the sensing circuit 314 exceeds the threshold value related to stop of wireless power transmission.

According to an embodiment of the disclosure, the control circuit 312 may perform charging with the power reception device 302 in any one of the normal charging mode or the high-speed charging mode, in the presence of the foreign object other than the power reception device 302. For example, the normal charging mode may be a mode for transmitting a power signal of a designated first power magnitude. The high-speed charging mode may be a mode for transmitting a power signal of a designated second power magnitude that is greater than the designated first power magnitude.

According to an embodiment of the disclosure, when the control circuit 312 performs high-speed charging with the power reception device 302 in the presence of the foreign object, the control circuit 312 may change the second power magnitude designated corresponding to high-speed charging into a third power magnitude that is less than the second power magnitude. According to an embodiment of the disclosure, when the control circuit 312 performs high-speed charging with the power reception device 302 in the state where the detection value of the ping signal is less than or equal to the first threshold value (e.g., in the absence of the foreign object), the control circuit 312 may output the power signal of the second power magnitude. According to an embodiment of the disclosure, when the control circuit 312 performs high-speed charging with the power reception device 302 in the state where the detection value of the ping signal exceeds the first threshold value (e.g., in the presence of the foreign object), the control circuit 312 may output the power signal of the third power magnitude that is less than the designated second power magnitude.

According to an embodiment, the communication circuit 313 may include at least one of a first communication circuit 313a and a second communication circuit 313b. The first communication circuit 313a may communicate with a first communication circuit 323a of the power reception device 302 by using a frequency that is the same as, for example, a frequency used for power transfer in the transmission coil 311L (e.g., an inband scheme). In an embodiment of the disclosure, the second communication circuit 313b may communicate with a second communication circuit 323b of the power reception device 302 by using a frequency that is different from, for example, the frequency used for power transfer in the transmission coil 311L (e.g., an outband scheme). For example, the second communication circuit 313b may obtain information related to a charging state (e.g., $V_{rec}$ information, $I_{out}$ information, various packets, messages, etc.) from the second communication circuit 323b by using any one of various short-range communication schemes such as Bluetooth, Bluetooth low energy (BLE), Wi-Fi, near field communication (NFC), etc.

According to an embodiment of the disclosure, the sensing circuit 314 may include at least one sensor and may detect at least one state of the power transmission device 301 by using the at least one sensor. According to an embodiment of the disclosure, the sensing circuit 314 may include at least one of a temperature sensor, a motion sensor, or a current (or voltage) sensor, and detect a temperature state of the power transmission device 301 by using the temperature sensor, a motion state of the power transmission device 301 by using the motion sensor, and a state (e.g., a current magnitude, a voltage magnitude, or a power magnitude) of an output signal of the power transmission device 301 by using the current (or voltage) sensor.

According to an embodiment of the disclosure, the current (or voltage) sensor may measure a signal in the power transmission circuit 311. The power transmission circuit 311 may measure the signal in at least a partial region of the transmission coil 311L, the matching circuit 311c, or the power production circuit 311b. For example, the current (or voltage) sensor may include a circuit for measuring a signal in a front end of the transmission coil 311L. According to an embodiment of the disclosure, the sensing circuit 314 may be a circuit for FOD.

According to an embodiment of the disclosure, the power reception device 302 may include a power reception circuit 321, a control circuit 322, a communication circuit 323, and/or a display 325. In the power reception device 302, a part of description of components corresponding to the power transmission device 301 may be omitted.

According to an embodiment of the disclosure, the power reception circuit 321 may include a reception coil 321L for wirelessly receiving power from the power transmission device 301, a matching circuit 321a, a rectifying circuit 321b for rectifying received alternate current (AC) power into direct current (DC) power, an adjusting circuit 321c for adjusting a charging voltage, a switching circuit 321d, and/or a battery 321e.

According to an embodiment of the disclosure, the control circuit 322 may perform overall control over the power reception device 302, generate various messages required for wireless power transmission, and deliver them to the communication circuit 323. For example, the control circuit 322 may generate a message related to selection of the charging mode (e.g., the normal charging mode or the high-speed charging mode) and deliver the generated message to the communication circuit 323, and after setting the charging mode, generate a message related to completion of setting of the charging mode and deliver the generated message to the communication circuit 323.

According to an embodiment, the communication circuit 323 may include at least one of the first communication circuit 323a and the second communication circuit 323b. The first communication circuit 323a may communicate with the power transmission device 301 through the reception coil 321L. The second communication circuit 323b may communicate with the power transmission device 301 by using any one of various short-range communication schemes such as Bluetooth, BLE, Wi-Fi, NFC, etc.

According to an embodiment of the disclosure, the power reception device 302 may further include at least one sensor 324 such as a current/voltage sensor, a temperature sensor, an illumination sensor, a sound sensor, etc., the display 325, and so forth.

According to various embodiments of the disclosure, an electronic device (e.g., the electronic device 101 of FIG. 1 or the power transmission device 301 of FIG. 3) may include a coil (e.g., the transmission coil 311L of FIG. 3), a power transmission circuit (e.g., the power transmission circuit 311 of FIG. 3) electrically connected with the coil, a detection circuit (e.g., the sensor module of FIG. 1 or the sensing circuit 314 of FIG. 3), and a control circuit (e.g., the processor 120 of FIG. 1 or the control circuit 312 of FIG. 3), in which the control circuit is configured to According to various embodiments of the disclosure, an electronic device includes a coil, a power transmission circuit electrically connected with the coil, a detection circuit, and a control circuit, in which the control circuit is configured to wirelessly output a first signal for identifying an access of a foreign object by first period intervals (or every first periods) through the coil (e.g., periodically output the first signal by a first period), by using the power transmission circuit, identify a change of the first signal, by using the detection circuit, wirelessly outputting the first signal by the first period intervals, when a detection value of the changed first signal is less than or equal to a first threshold value, and wirelessly output the first signal by a second period intervals longer than the first period intervals, when the detection value of the changed first signal exceeds the first threshold value.

According to various embodiments of the disclosure, the first signal for identifying the access of the foreign object may include a ping signal.

According to various embodiments of the disclosure, the electronic device may further include a communication circuit (e.g., the communication module 190 of FIG. 1 or the first communication circuit 313a of FIG. 3), in which the control circuit is configured to transmit a second signal for wireless power transmission through the power transmission circuit, upon receiving a response signal corresponding to the first signal from an external electronic device, through the communication circuit, to identify a change of the second signal, by using the detection circuit, and to stop the wireless power transmission, when a detection value of the changed second signal exceeds a threshold value related to stop of the wireless power transmission.

According to various embodiments of the disclosure, the response signal may be an SSP signal.

According to various embodiments of the disclosure, the control circuit may be configured to change the threshold value related to stop of the wireless power transmission when the detection value of the changed first signal exceeds the first threshold value.

According to various embodiments of the disclosure, the control circuit may be configured, when the detection value of the changed first signal exceeds the first threshold value, to change a second threshold value related to stop of wireless power transmission into a third threshold value less than the second threshold value in a normal charging mode and to change a fourth threshold value related to stop of wireless power transmission into a fifth threshold value less than the fourth threshold value in a high-speed charging mode.

According to various embodiments of the disclosure, the control circuit may be configured to identify a charging mode, upon receiving a response signal corresponding to the first signal from the external electronic device, transmit the second signal with a first power magnitude designated corresponding to a normal charging mode, when the identified charging mode is the normal charging mode, and to transmit the second signal with a second power magnitude that is designated corresponding to a high-speed charging mode and is greater than the first power magnitude, when the identified charging mode is the high-speed charging mode.

According to various embodiments of the disclosure, the control circuit may be configured, when the first period intervals are changed into the second period intervals, to change a power magnitude designated corresponding to the high-speed charging mode into a third power magnitude that is less than the second power magnitude, and to transmit the second signal with the third power magnitude in the high-speed charging mode.

According to various embodiments of the disclosure, the control circuit may be configured to transmit to the external electronic device, information indicating that the second signal is transmitted with the third power magnitude, through the communication circuit, when transmitting the second signal with the third power magnitude.

According to various embodiments of the disclosure, an electronic device includes a coil, a power transmission circuit electrically connected with the coil, a detection circuit, and a control circuit, in which the control circuit is configured to wirelessly output a ping signal by first period intervals (or every first periods) through the coil, by using the power transmission circuit, to identify presence or absence of a foreign object, based on a change of the ping signal, detected using the detection circuit, to change a magnitude of a power signal wirelessly transmitted to an external electronic device, based on the presence or absence of the foreign object, and transmit the power signal with the changed magnitude through the power transmission circuit, upon receiving a response signal corresponding to the ping signal from the external electronic device.

According to various embodiments of the disclosure, the control circuit may be configured to wirelessly outputting the first signal by the first period intervals, when a detection value of the ping signal is less than or equal to a first threshold value by using the detection circuit and to change the first period intervals into a second period intervals longer than the first period intervals and identify presence or absence of the foreign object when the detection value of the changed ping signal exceeds the first threshold value.

According to various embodiments of the disclosure, the control circuit may be configured to change the threshold value related to stop of wireless power transmission, when the detection value of the changed ping signal exceeds the first threshold value.

According to various embodiments of the disclosure, the control circuit may be configured, when the detection value of the changed first signal exceeds the first threshold value, to change a second threshold value related to stop of wireless power transmission into a third threshold value less than the second threshold value in a normal charging mode and to change a fourth threshold value related to stop of wireless power transmission into a fifth threshold value less than the fourth threshold value in a high-speed charging mode.

According to various embodiments of the disclosure, the control circuit may be configured to identify a charging mode, upon receiving a response signal corresponding to the ping signal, to transmit a first power signal of a first magnitude designated corresponding to a normal charging mode, when the identified charging mode is the normal charging mode, and to transmit a second power signal of a second magnitude that is designated corresponding to a high-speed charging mode and is greater than the first magnitude, when the identified charging mode is the high-speed charging mode.

According to various embodiments of the disclosure, the control circuit may be configured, when the foreign object exists, to change the second magnitude designated corresponding to the high-speed charging mode into a third magnitude that is less than the second magnitude, to transmit a third signal of the third magnitude in the high-speed charging mode, and to transmit to the external electronic device, information indicating that the second signal is transmitted with the third magnitude, through the communication circuit.

Figure 4A:
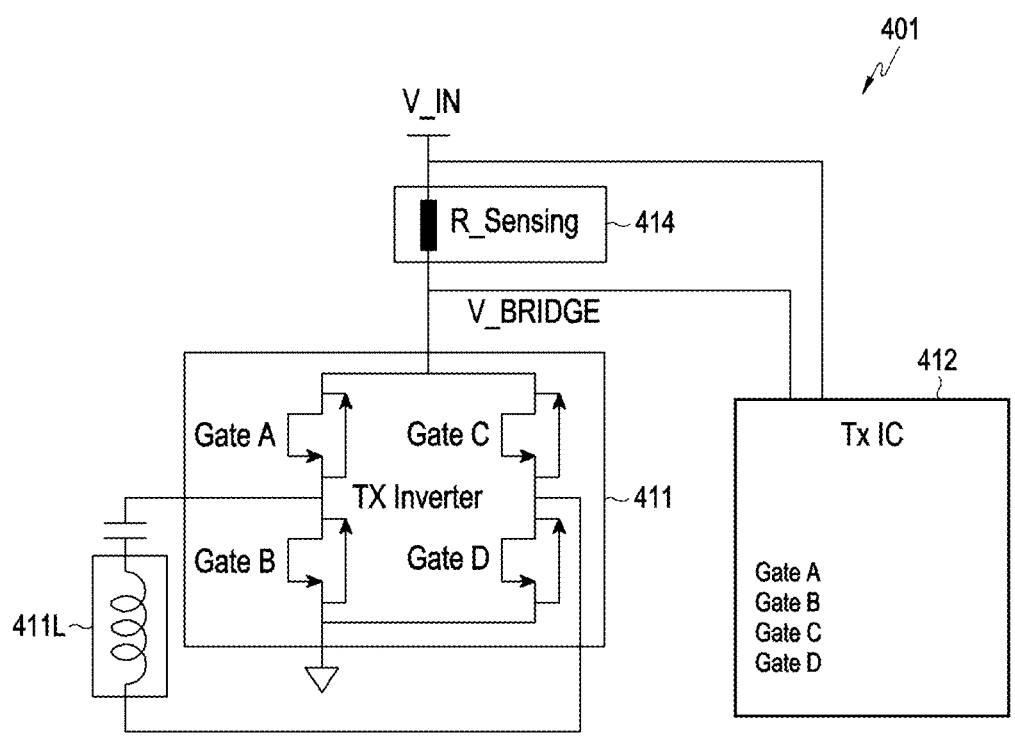
FIG. 4A illustrates an example of a detection circuit of a power transmission device according to various embodiments.

FIG. 4A illustrates an example of a sensing circuit of a power transmission device according to various embodiments.

Referring to FIG. 4A, a sensing circuit (e.g., the sensing circuit 314 of FIG. 3) according to an embodiment of the disclosure may include a current (or voltage) sensor (or detection circuit) 414. To generate a power signal in a transmission coil 411L (e.g., the transmission coil 311L of FIG. 3) in a front end (e.g., V_BRIDGE) of the power transmission circuit 411 (e.g., the power transmission circuit 311 of FIG. 3), the current (or voltage) sensor 414 may measure a current or voltage flowing to the power transmission circuit 411 from an input voltage (e.g., V_IN) and provide the measured current or voltage to a control circuit (Tx integrated chip (IC)) 412 (e.g., the control circuit 312 of FIG. 3). The current or voltage flowing to the power transmission circuit 411 may be proportional to current or voltage flowing in the transmission coil 411L. According to an embodiment of the disclosure, the current (or voltage) sensor 414 may measure current or voltage flowing in the transmission coil 411L and provide the measured current or voltage to the control circuit 412.

FIG. 4A illustrates an example of a current detection circuit of a power transmission device according to various embodiments.

Figure 4B:
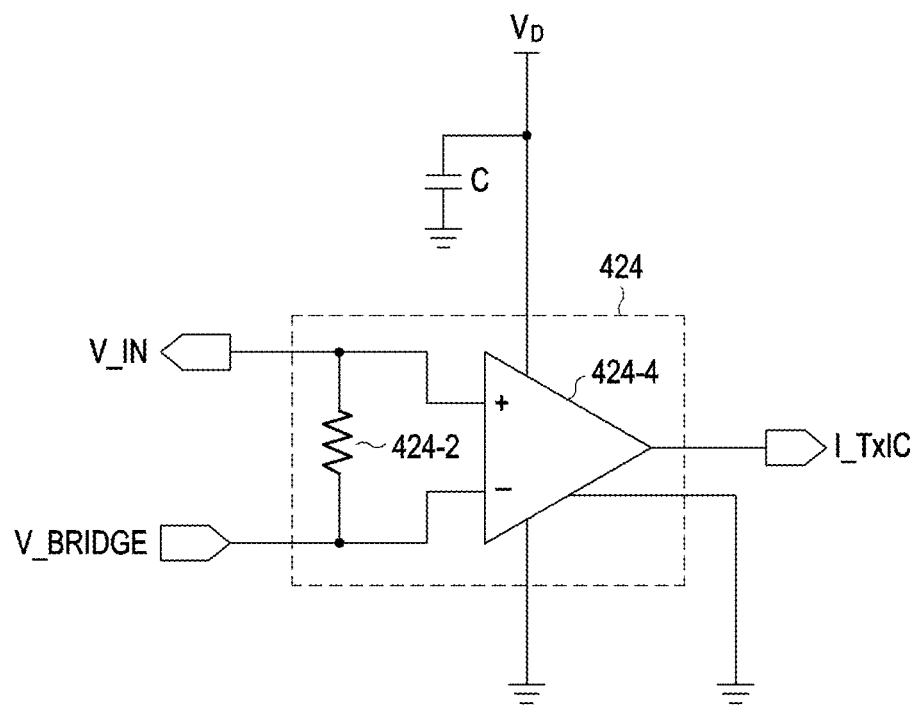
FIG. 4B illustrates an example of a current detection circuit of a power transmission device according to various embodiments.

Referring to FIG. 4B, a current detection circuit 424 (e.g., the sensing circuit 314 of FIG. 3 or the current sensor 414 of FIG. 4A) according to an embodiment of the disclosure may include a resistance circuit 424-2 and an operational amplifier (OP AMP) 424-4. According to an embodiment of the disclosure, the OP AMP 424-4 of the current detection circuit 424 may detect a value of current flowing between the input voltage (e.g., V_IN) applied to output a power signal through a transmission coil (e.g., the transmission coil 311L of FIG. 3 or the transmission coil 411L of FIG. 4) and the front end (e.g., V_BRIDGE) of the power transmission circuit 411, by using the resistance circuit 424-2 upon application of a driving voltage VD, and provide a signal (e.g., I_TxIC) corresponding to the detected current value to the control circuit (Tx IC) 412 (e.g., the control circuit 312 of FIG. 3).

Figure 5A:
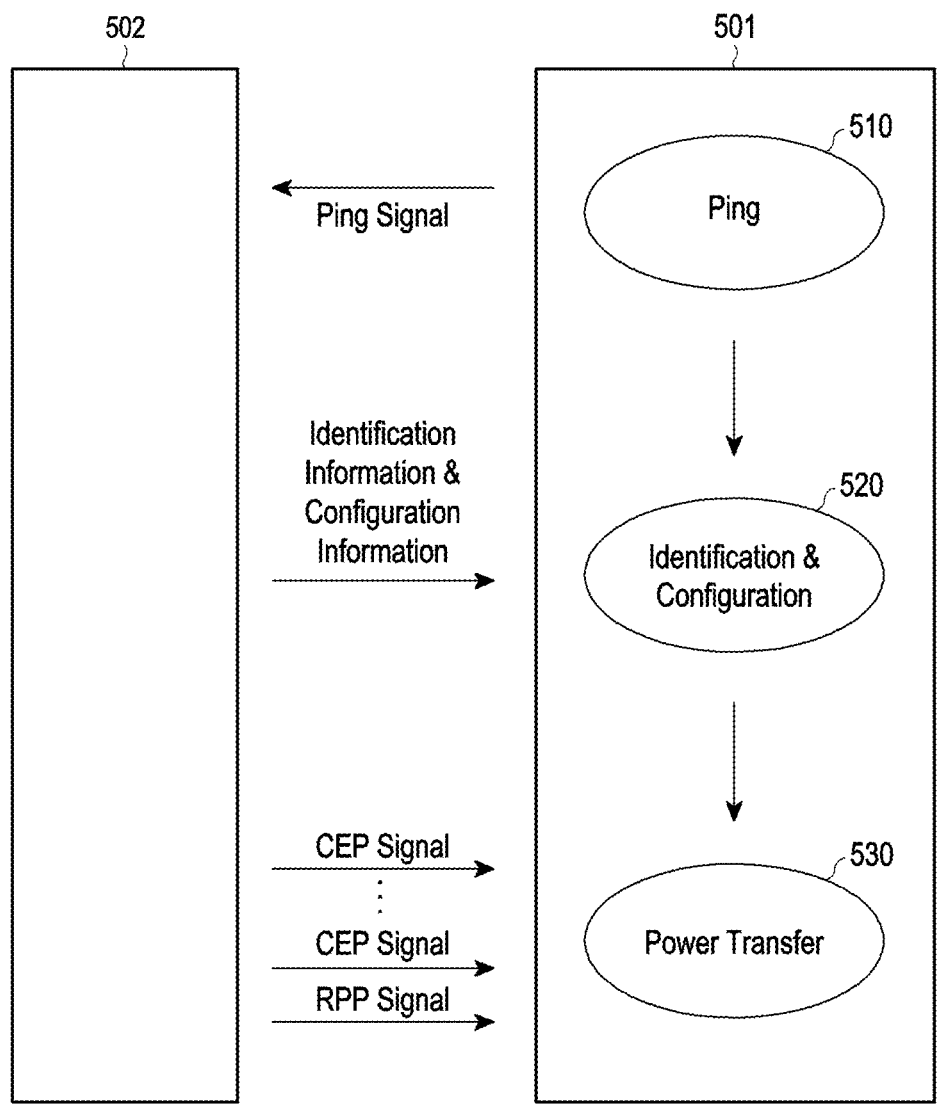
FIGS. 5A and 5B illustrate diagrams for describing an operation state of a power transmission device in wireless charging, according to various embodiments.
Figure 5B:
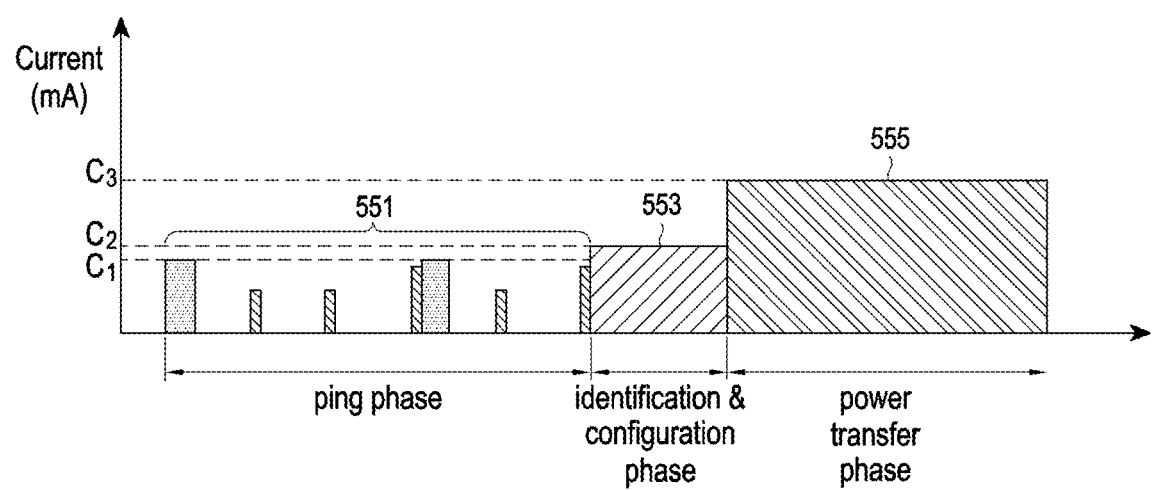

FIGS. 5A and 5B illustrate diagrams for describing an operation state of a power transmission device in wireless charging, according to various embodiments.

Referring to FIG. 5A, according to an embodiment of the disclosure, a power transmission device 501 (e.g., the electronic device 101 of FIG. 1 or the power transmission device 301 of FIG. 3) may output at least one signal corresponding to a ping phase 510, an identification & configuration phase 520, and/or a power transfer phase 530 to provide power to a power reception device 502 (e.g., the electronic device 102 of FIG. 2 or the power reception device 302 of FIG. 3).

According to an embodiment of the disclosure, the power transmission device 501 may transmit a ping signal, e.g., a digital ping signal or an analog ping signal in the ping phase 510. For example, the power transmission device 501 may periodically transmit the ping signal. According to an embodiment of the disclosure, the power transmission device 501 may transmit the ping signal by changing a period based on the presence or absence of the foreign object other than the power reception device 502, in the ping phase 510. According to an embodiment of the disclosure, the power transmission device 501 may output a ping signal every first period (e.g., 550 ms) and identify a change of the output ping signal, such that the power transmission device 501 may maintain the first period, when a detection value of the changed ping signal is less than or equal to the first threshold value, and may change the first period into the second period (e.g., 2000 ms) that is longer than the first period, when the detection value of the changed ping signal exceeds the first threshold value. For example, upon failing to receive a response signal corresponding to the ping signal of the first period from the power reception device 302 when the detection value of the pin signal exceeds the first threshold value, the power transmission device 501 may determine (or identify) that a foreign object other than the power reception device 302 exists, output the ping signal of the second period, and change the threshold value related to stop of output of a wireless power transmission signal. For example, the power transmission device 501 may change the threshold value related to stop of output of the wireless power transmission signal in the normal charging mode from the second threshold value to the third threshold value that is less than the second threshold value or may change the threshold value related to stop of output of the wireless power transmission signal in the high-speed charging mode from the fourth threshold value to the fifth threshold value that is less than the fourth threshold value.

According to an embodiment of the disclosure, the power transmission device 501 may sense (or detect) the power reception device 502 based on reception of a response corresponding to the ping signal of the first period or the second period transmitted from the power transmission device 501.

According to an embodiment of the disclosure, upon sensing the power reception device 502, the power transmission device 501 may receive identification information and configuration information for authenticating the power reception device 502 from the power reception device 502 in the identification & configuration phase 520. The identification information may include information for identifying the power reception device 502, and the configuration information may include various information required for the power reception device 502 to receive power. The power transmission device 501 may authenticate the power reception device 502 based on the identification information and the configuration information from the power reception device 502.

According to an embodiment of the disclosure, the power transmission device 501 may further receive charging mode information (e.g., the normal charging mode or the high-speed charging mode) from the power reception device 502 and provide power supply information related to the charging mode information to the power reception device 502. The power supply information related to the charging mode may include a transmission voltage, a power value, a frequency, and a parameter value for power transmission. The power reception device 502 may set the charging mode based on the power supply information related to the charging mode information. For example, when the power transmission device 501 performs high-speed charging with the power reception device 502 in the presence of a foreign object, the power transmission device 501 may change the second power magnitude designated corresponding to high-speed charging into the third power magnitude that is less than the second power magnitude, and provide information about the changed power magnitude to the power reception device 502. According to an embodiment of the disclosure, when the power transmission device 501 performs high-speed charging with the power reception device 502 in the presence of the foreign object, the power transmission device 501 may provide to the power reception device 502, information (e.g., a data packet) indicating that the second power magnitude designated corresponding to high-speed charging is changed into the third power magnitude that is less than the second power magnitude.

According to an embodiment of the disclosure, the power transmission device 501 may transmit a power signal for wireless power transmission to the power reception device 502 in the power transfer phase 530, upon completion of authentication (or authentication and charging mode setting). According to an embodiment of the disclosure, the power transmission device 501 may transmit at least one CEP signal to the power reception device 502 in the power transfer phase 530, and receive at least one RPP signal from the power reception device 502. The CEP signal may include information indicating a magnitude of transmission power transmitted from the power transmission device 501, and the RPP signal may include information indicating a magnitude of reception power received in the power reception device 502. The power transmission device 501 may transmit power to the power reception device 502 based on the CEP signal and the RPP signal.

According to an embodiment of the disclosure, in case of wirelessly outputting the power signal to the power reception device 502 in the absence of the foreign object, the power transmission device 501 may detect a change of the power signal and stop outputting the power signal when the detection value of the changed power signal exceeds the threshold value related to stop of wireless power transmission. According to an embodiment of the disclosure, when wirelessly outputting the power signal to the power reception device 502 in the presence of the foreign object, the power transmission device 501 may detect a change of the power signal and stop outputting the power signal when the detection value of the changed power signal exceeds the threshold value related to stop of wireless power transmission.

Referring to FIG. 5B, according to an embodiment of the disclosure, the power transmission device 501 (e.g., the electronic device 101 of FIG. 1 or the power transmission device 301 of FIG. 3) may wirelessly output a designated signal or a designated power signal (or a signal of a designated current or voltage) through a transmission coil (e.g., the transmission coil 311L of FIG. 3 or the transmission coil 411L of FIG. 4), when outputting at least one signal corresponding to at least one of the ping phase 510, the identification & configuration phase 520, and/or the power transfer phase 530.

According to an embodiment of the disclosure, the power transmission device 501 may periodically output a first signal 551 based on a first charging current $C_1$ in the ping phase 510 and output a signal 553 related to authentication by using a second charging current $C_2$ in the identification & configuration phase 520 and a second signal 555 by using a third charging current $C_3$ in the power transfer phase 530.

According to various embodiments of the disclosure, when outputting the first signal, the power transmission device 501 may change an output period of the first signal from the first period into the second period that is longer than the first period based on energy (power, current, or voltage) (e.g., the detection value of the change of the first signal) sensed in a transmission coil (e.g., the transmission coil 311L of FIG. 3 or the transmission coil 411L of FIG. 4).

According to various embodiments of the disclosure, when outputting the second signal, the power transmission device 501 may identify whether to stop wireless power transmission between the power transmission device 501 and the power reception device 502 and stop outputting power to the power reception device 502, based on the energy (power, current, or voltage) (e.g., the detection value of the change of the first signal) sensed in the transmission coil (e.g., the transmission coil 311L of FIG. 3 or the transmission coil 411L of FIG. 4).

Figure 6:
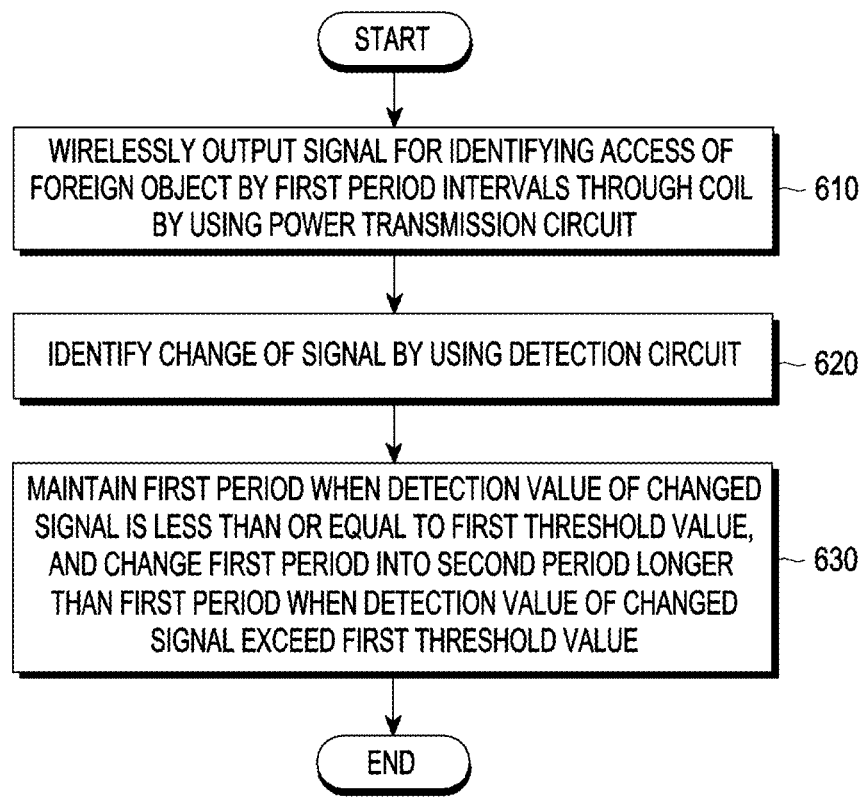
FIG. 6 illustrates a flowchart of a signal period changing operation, performed in a power transmission device, for identifying an access of a foreign object according to various embodiments.

FIG. 6 illustrates a flowchart of a signal period changing operation, performed in a power transmission device, for identifying an access of a foreign object according to various embodiments.

Referring to FIG. 6, operations 610 through 630 according to various embodiments of the disclosure may be understood as operations performed by a control circuit (e.g., the processor 120 of FIG. 1, the control circuit 312 of FIG. 3, or the control circuit 412 of FIG. 4, and hereinafter, described by taking the control circuit 312 of FIG. 3 as an example) of an electronic device (e.g., the electronic device 101 of FIG. 1, the power transmission device 301 of FIG. 3, or the power transmission device 501 of FIG. 5). According to an embodiment of the disclosure, at least one of operations 610 through 630 may be omitted, an order of some of operations 510 through 590 may be changed, or other operations may be added.

In operation 610, the control circuit 312 according to an embodiment of the disclosure may wirelessly output a signal for identifying an access of a foreign object every first period through a coil (e.g., the transmission coil 311L of FIG. 3 or the transmission coil 411L of FIG. 4) by using a power transmission circuit (e.g., the power transmission circuit 311 of FIG. 3). For example, the control circuit 312 may wirelessly output a ping signal (e.g., an analog signal of a first frequency (e.g., 148 kHz) or a digital signal of the first period) every first period (e.g., 550 ms) through the transmission coil 311L by using the power transmission circuit 311.

In operation 620, the control circuit 312 according to an embodiment of the disclosure may identify a change of an output signal by using a detection circuit (e.g., the sensing circuit 314 of FIG. 3). For example, the control circuit 312 may detect a value (e.g., electrical energy (power, voltage, or power)) of a ping signal changed by the foreign object through a transmission coil (e.g., 311L) when outputting the ping signal by using the sensing circuit 314.

In operation 630, the control circuit 312 according to an embodiment of the disclosure may maintain the first period when a detection value of the changed first signal is less than or equal to the first threshold value, and may change the first period into the second period (e.g., 2000 ms) that is longer than the first period, when the detection value of the changed first signal exceeds the first threshold value. For example, a time interval of the first period and the second period may be selectively changed into a value other than 550 ms and 2000 ms, depending on various power transfer environments.

According to various embodiments of the disclosure, a method for wirelessly transmitting power based on foreign object detection in an electronic device (e.g., the electronic device 101 of FIG. 1, the power transmission device 301 of FIG. 3, or the power transmission device 501 of FIG. 5) includes wirelessly outputting a first signal for identifying an access of a foreign object by first period intervals (or every first periods) through a coil (e.g., the transmission coil 311L of FIG. 3 or the transmission coil 411L of FIG. 4), by using a power transmission circuit (e.g., the power transmission circuit 311 of FIG. 3 or the power transmission circuit 411 of FIG. 4), identifying a change of the first signal, by using a detection circuit (e.g., the sensor module 174 of FIG. 1, the sensing circuit 314 of FIG. 3, or the sensing circuit 314 of FIG. 4), and controlling the power transmission circuit based on the detection value of the changed first signal, wherein when a detection value of the changed first signal is less than or equal to a first threshold value, the power transmission circuit is controlled to maintain wirelessly outputting the first signal by the first period intervals, and when a detection value of the changed first signal exceeds the first threshold value, the power transmission circuit is controlled to wirelessly output the first signal by a second period intervals longer than the first period intervals, when the detection value of the changed first signal exceeds the first threshold value.

According to various embodiments of the disclosure, the first signal for identifying the access of a foreign object may include a ping signal.

According to various embodiments of the disclosure, the method may further include receiving a response signal corresponding to the first signal for identifying the access of the foreign object from an external electronic device (e.g., the electronic device 102 of FIG. 1, the power reception device 302 of FIG. 3, or the power reception device 502 of FIG. 5), through a communication circuit (e.g., the communication module 190 of FIG. 1 or the first communication circuit 313a of FIG. 3), transmitting a second signal for wireless power transmission through the power transmission circuit, upon receiving the response signal, identifying a change of the second signal, by using the detection circuit, and stopping wireless power transmission, when a detection value of the changed second signal exceeds a threshold value related to stop of the wireless power transmission.

According to various embodiments of the disclosure, the method may further include changing the threshold value related to stop of the wireless power transmission when the detection value of the changed first signal exceeds the first threshold value.

According to various embodiments of the disclosure, the changing of the threshold value related to stop of the wireless power transmission may include changing a second threshold value related to stop of wireless power transmission into a third threshold value less than the second threshold value in a normal charging mode and changing a fourth threshold value related to stop of wireless power transmission into a fifth threshold value less than the fourth threshold value in a high-speed charging mode.

According to various embodiments of the disclosure, the method may further include identifying a charging mode, upon receiving a response signal corresponding to the first signal for identifying the access of the foreign object from the external electronic device, transmitting a first power signal of a first power magnitude designated corresponding to a normal charging mode, when the identified charging mode is the normal charging mode, and transmitting a second power signal of a second power magnitude designated corresponding to a high-speed charging mode, when the identified charging mode is the high-speed charging mode.

According to various embodiments of the disclosure, the method may further include, when the first period intervals are changed into the second period intervals, changing the second power magnitude designated corresponding to the high-speed charging mode into a third power magnitude that is less than the second power magnitude, and transmitting a third power signal of the third power magnitude in the high-speed charging mode.

According to various embodiments of the disclosure, the method may further include transmitting to the external electronic device, information (e.g., a data packet) indicating that the second signal is transmitted with the third power magnitude, through the communication circuit, when transmitting the second signal with the third power magnitude.

Figure 7:
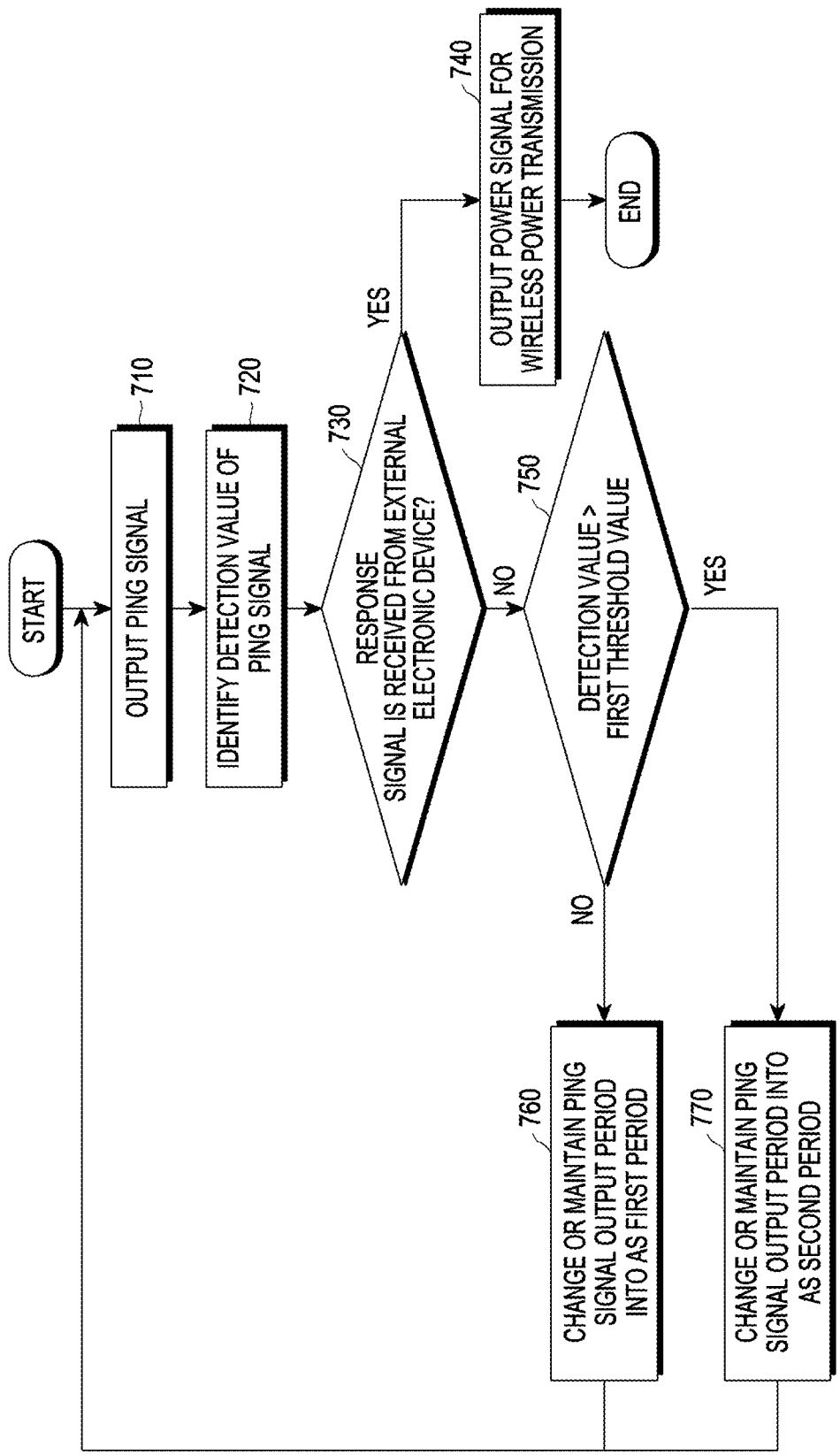
FIG. 7 illustrates a flowchart of a ping signal period changing operation performed in a power transmission device, according to various embodiments.

FIG. 7 illustrates a flowchart of a ping signal period changing operation performed in a power transmission device, according to various embodiments.

Referring to FIG. 7, operations 710 through 770 according to various embodiments of the disclosure may be understood as operations performed by a control circuit (e.g., the processor 120 of FIG. 1, the control circuit 312 of FIG. 3, or the control circuit 412 of FIG. 4, and hereinafter, described by taking the control circuit 312 of FIG. 3 as an example) of an electronic device (e.g., the electronic device 101 of FIG. 1, the power transmission device 301 of FIG. 3, or the power transmission device 501 of FIG. 5). In an embodiment, at least one of operations 710 through 770 may be omitted, an order of some of operations 710 through 770 may be changed, or other operations may be added.

In operation 710, the control circuit 312 according to an embodiment of the disclosure may wirelessly output a ping signal every designated period (e.g., first period) through a coil (e.g., the transmission coil 311L of FIG. 3 or the transmission coil 411L of FIG. 4) by using a power transmission circuit (e.g., the power transmission circuit 311 of FIG. 3). For example, the control circuit 312 may wirelessly output a ping signal (e.g., an analog signal of a first frequency (e.g., 148 kHz) or a digital signal of the first period) every first period (e.g., 550 ms) through the transmission coil 311L by using the power transmission circuit 311.

In operation 720, the control circuit 312 according to an embodiment of the disclosure may identify a detection value of the output ping signal by using a detection circuit (e.g., the sensing circuit 314 of FIG. 3). For example, the control circuit 312 may detect a value (e.g., electrical energy (power, voltage, or power)) of a ping signal changed by the foreign object through a transmission coil (e.g., 311L) when outputting the ping signal by using the sensing circuit 314. According to an embodiment of the disclosure, the control circuit 312 may detect a value of a ping signal a plurality of times every designated time intervals (e.g., an interval of 1 ms) and identify (or monitor) a plurality of detection values.

In operation 730, the control circuit 312 according to an embodiment of the disclosure may determine whether a response signal is received from an external electronic device (e.g., the electronic device 102 of FIG. 1, the power reception device 302 of FIG. 3, or the power reception device 502 of FIG. 5). For example, the response signal may be an SSP signal.

In operation 740, when the response signal is received from the external electronic device (e.g., the electronic device 102 of FIG. 1, the power reception device 302 of FIG. 3, or the power reception device 502 of FIG. 5), the control circuit 312 according to an embodiment of the disclosure may output a power transmission signal for wireless power transmission through the power transmission circuit 311. The external electronic device may receive the power transmission signal and perform charging.

In operation 750, the control circuit 312 according to an embodiment of the disclosure may determine whether a detection value of the ping signal exceeds the first threshold value. For example, the control circuit 312 may determine whether the detection value of the ping signal is less than or equal to or exceeds the first threshold value. For example, the first threshold value may be a current threshold value or a voltage threshold value. According to various embodiments of the disclosure, the control circuit 312 may determine whether a current detection value of the changed ping signal exceeds a first current threshold value or a voltage detection value of the changed ping signal exceeds a first voltage threshold value. According to various embodiments of the disclosure, the control circuit 312 may determine that the current or voltage detection value of the ping signal exceeds the first current or voltage threshold value when the current or voltage detection value of the ping signal exceeds the first current or voltage threshold value n times or more (e.g., three times), as a result of identifying current detection values of a plurality of ping signals or voltage detection values of the plurality of ping signals.

In operation 760, the control circuit 312 according to an embodiment of the disclosure may change a ping signal output period into the first period or maintain the ping signal output period when the detection value of the ping signal does not exceed the first threshold value, upon failing to receive the response signal from the external electronic device. For example, the first period may be a default time interval (e.g., 550 ms). According to an embodiment of the disclosure, the control circuit 312 may determine (or identify) that the foreign object does not exist in the position (e.g., the position on the charging pad where the external electronic device is placed) corresponding to the transmission coil (e.g., 311L), when the detection value of the ping signal does not exceed the first threshold value, upon failing to receive the response signal from the external electronic device.

In operation 770, the control circuit 312 according to an embodiment of the disclosure may change the ping signal output period into the second period (e.g., 2000 ms) longer than the first period or maintain the ping signal output period, when the detection value of the ping signal exceeds the first threshold value, upon failing to receive the response signal from the external electronic device. For example, a time interval of the first period and the second period may be selectively changed into a value other than 550 ms and 2000 ms, depending on various power transfer environments. According to an embodiment of the disclosure, the control circuit 312 may determine (or identify) that the foreign object does not exist in the position (e.g., the position on the charging pad where the external electronic device is placed) corresponding to the transmission coil (e.g., 311L), when the detection value of the ping signal exceeds the first threshold value, upon failing to receive the response signal from the external electronic device.

According to various embodiments of the disclosure, the control circuit 312 may maintain or change the threshold value related to stop of output of a power signal for wireless power transmission, based on the ping signal output period or the charging mode. According to various embodiments of the disclosure, the threshold value related to stop of wireless power transmission may be a threshold value for stopping wireless power transmission, when the power signal is wirelessly output to the external electronic device. According to various embodiments of the disclosure, the threshold value related to stop of output of the power signal for wireless power transmission may be an FOD threshold value. For example, the FOD threshold value may be a threshold value of a difference between a transmission power transmitted from the power transmission device 301 and a reception power received by the power reception device 302. The FOD threshold value may be designated to (or changed into) one of a plurality of threshold values (e.g., a second threshold value, a third threshold value, a fourth threshold value, or a fifth threshold value) based on power transmission/reception characteristics (e.g., a ping period or a charging mode) of the power transmission device 301 and the power reception device 302. According to various embodiments of the disclosure, the plurality of threshold values may include more or less threshold values than the second through fifth threshold values.

According to various embodiments of the disclosure, the FOD threshold value may be the second threshold value (e.g., 1300 mW) when the ping signal has a first period (550 ms) and the charging mode is a normal charging mode, and the FOD threshold value may be the third threshold value (e.g., 560 mW) when the ping signal has a second period (2000 ms) and the charging mode is the normal charging mode. According to various embodiments of the disclosure, the FOD threshold value may be the fourth threshold value (e.g., 2600 mW) when the ping signal has the first period (550 ms) and the charging mode is the high-speed charging mode, and the FOD threshold value may be the fifth threshold value (e.g., 1300 mW) when the ping signal has the second period (2000 ms) and the charging mode is the high-speed charging mode.

The control circuit 312 may receive information about received power from the power reception device 302 after transmitting the power signal, to identify the difference between the transmission power and the reception power. The control circuit 312 may stop transmitting the power signal for wireless power transmission when the difference between the transmission power and the reception power exceeds the designated or changed FOD threshold value (e.g., the second threshold value, the third threshold value, the fourth threshold value, or the fifth threshold value).

Figure 8:
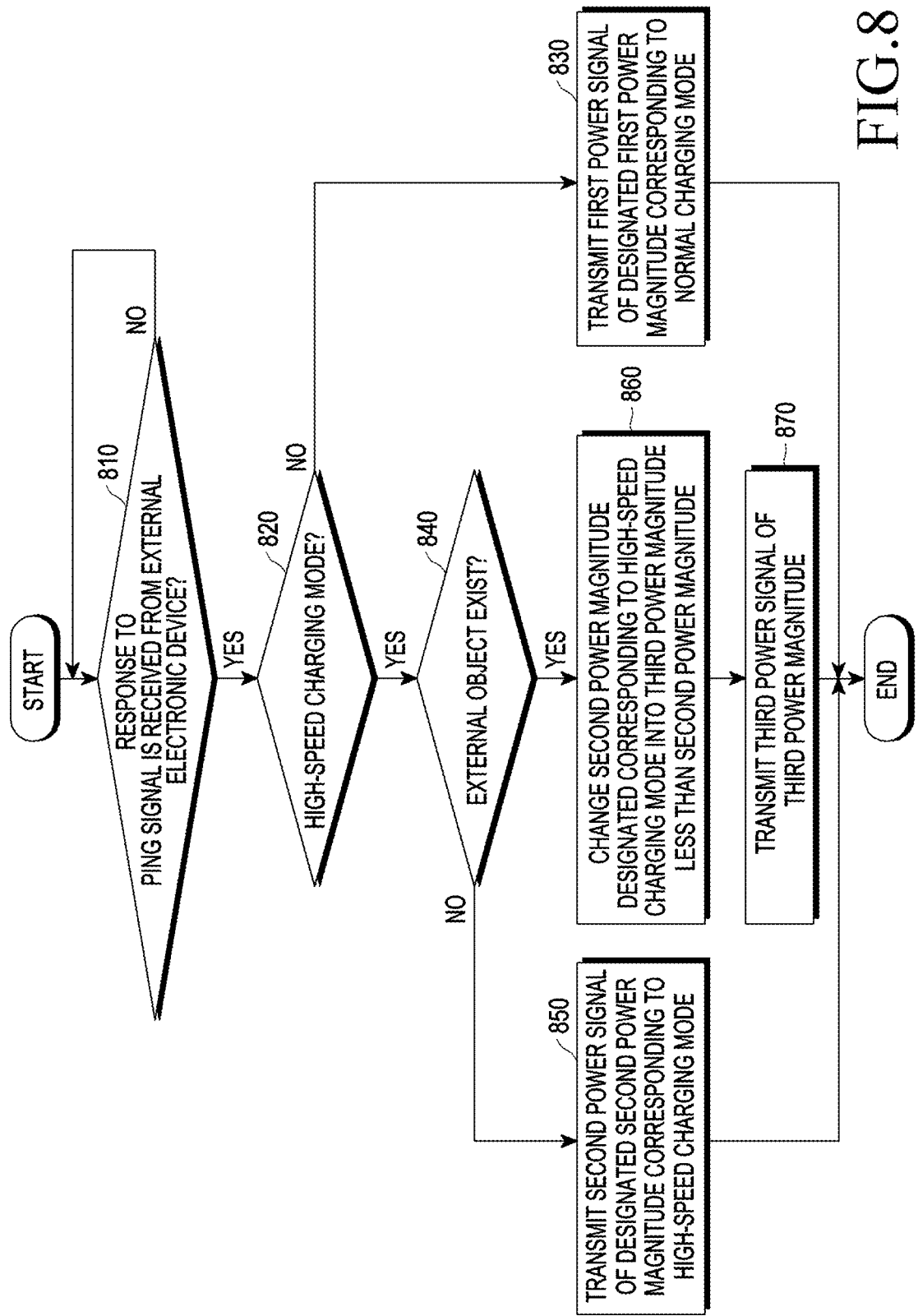
FIG. 8 illustrates a flowchart of an output power magnitude control operation, performed in a power transmission device, for controlling a magnitude of power output to a power reception device based on foreign object detection, according to various embodiments.

FIG. 8 illustrates a flowchart of an output power magnitude control operation, performed in a power transmission device, for controlling a magnitude of power output to a power reception device based on foreign object detection, according to various embodiments.

Referring to FIG. 8, operations 810 through 870 according to various embodiments of the disclosure may be understood as operations performed by a control circuit (e.g., the processor 120 of FIG. 1, the control circuit 312 of FIG. 3, or the control circuit 412 of FIG. 4, and hereinafter, described by taking the control circuit 312 of FIG. 3 as an example) of an electronic device (e.g., the electronic device 101 of FIG. 1, the power transmission device 301 of FIG. 3, or the power transmission device 501 of FIG. 5). According to an embodiment of the disclosure, at least one of operations 810 through 870 may be omitted, an order of some of operations 510 through 590 may be changed, or other operations may be added.

In operation 810, the control circuit 312 according to an embodiment of the disclosure may determine whether a response signal corresponding to the ping signal is received from a power reception device (e.g., the electronic device 102 of FIG. 1, the power reception device 302 of FIG. 3, or the power reception device 502 of FIG. 5). For example, the control circuit 310 may receive the response signal (e.g., the SSP signal) from the power reception device when outputting the ping signal of the first period or outputting the ping signal of the second period.

In operation 820, the control circuit 312 according to an embodiment of the disclosure may determine whether to perform high-speed charging with the power reception device. For example, the control circuit 312 may determine whether to perform high-speed charging with the power reception device, based on charging mode information (e.g., the normal charging mode or the high-speed charging mode) received from the power reception device. For example, the normal charging mode may be a mode for providing a first power signal of the first power magnitude/level (e.g., the first voltage magnitude or the first current magnitude or 5V), and the high-speed charging mode may be a mode for providing the second power signal of the second power magnitude/level (e.g., the first voltage magnitude, the first current magnitude, or 9V) that is greater than the first voltage.

In operation 830, the control circuit 310 according to an embodiment of the disclosure may transmit the first power signal designated corresponding to the normal charging mode to the power reception device when the control circuit 312 does not perform high-speed charging.

In operation 840, when the control circuit 312 according to an embodiment of the disclosure performs high-speed charging, the control circuit 312 may identify presence or absence of a foreign object other than the power reception device (e.g., the detection value of the ping signal exceeds the first threshold value when the response signal is not received from the external electronic device). For example, the control circuit 312 may identify whether the power reception device responds in the presence of the foreign object.

In operation 850, when the control circuit 312 according to an embodiment of the disclosure performs high-speed charging in the absence of the foreign object (e.g., in a state where the detection value of the ping signal does not exceed the first threshold value when the response signal is not received from the external electronic device), the control circuit 312 may transmit the second power signal of the second power magnitude/level designated corresponding to high-speed charging.

In operation 860, when the control circuit 312 performs high-speed charging in the presence of the foreign object, the control circuit 312 may change the second power magnitude/level designated corresponding to high-speed charging into the third power magnitude/level that is less than the second power magnitude/level.

In operation 870, when the control circuit 312 performs high-speed charging in the presence of the foreign object, the control circuit 312 may transmit the third power signal of the changed third power magnitude/level to the power reception device.

Figure 9:
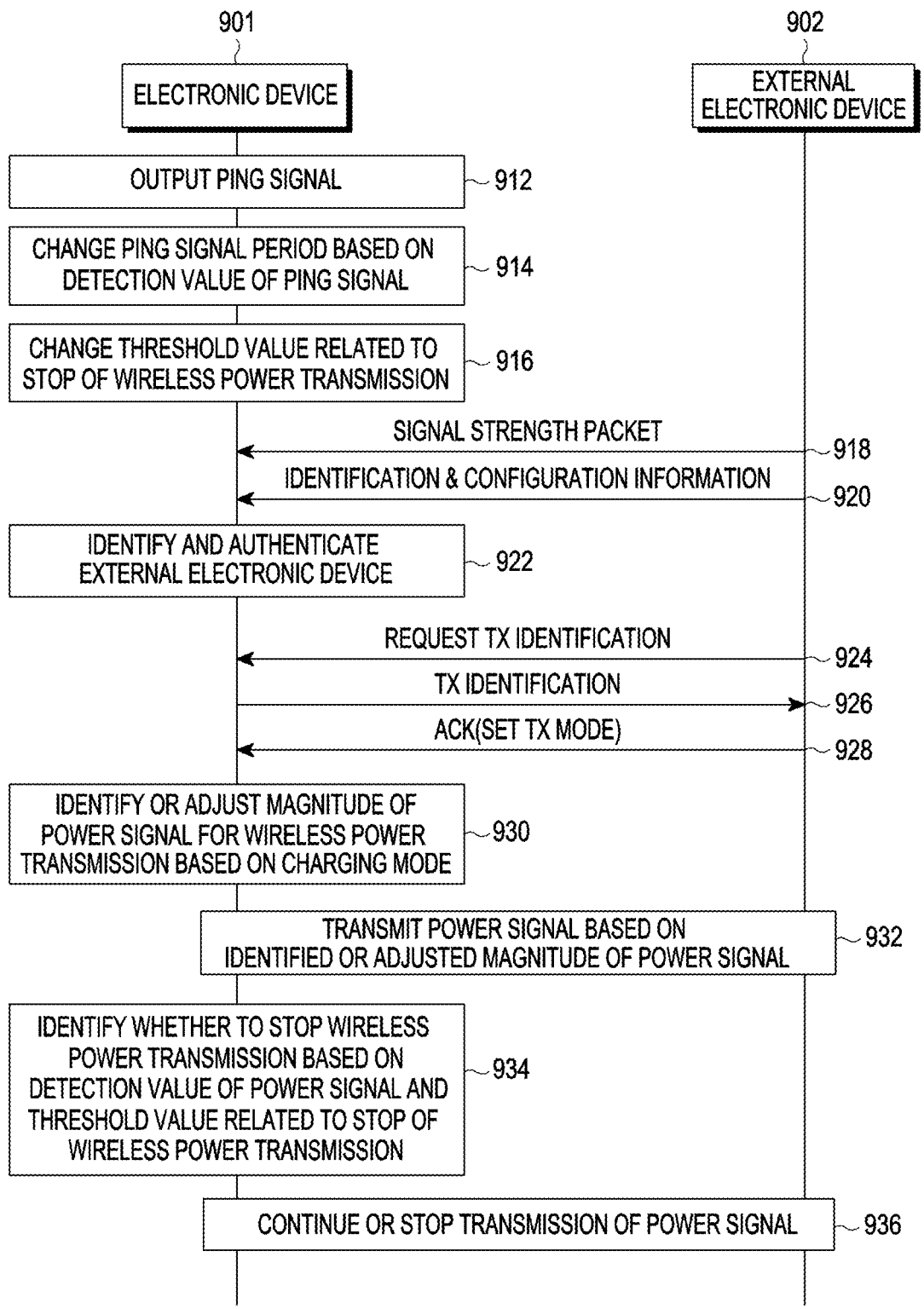
FIG. 9 illustrates a flowchart of a wireless power transmission/reception operation based on foreign object detection between an electronic device and an external electronic device, according to various embodiments.

FIG. 9 illustrates a flowchart of a wireless power transmission/reception operation based on foreign object detection between an electronic device and an external electronic device, according to various embodiments.

Referring to FIG. 9, operations 912 through 916, 922, 926, and 930 through 936 according to various embodiments of the disclosure may be understood as operations performed in an electronic device 901 (e.g., the electronic device 101 of FIG. 1, the power transmission device 301 of FIG. 3, or the power transmission device 501 of FIG. 5). Operations 918, 920, 924, and 928 according to various embodiments of the disclosure may be understood as operations performed in an external electronic device 902 (e.g., the electronic device 102 of FIG. 1, the power reception device 302 of FIG. 3, or the power reception device 502 of FIG. 5). According to an embodiment of the disclosure, at least one of operations 912 through 936 may be omitted, an order of some of operations 510 through 590 may be changed, or other operations may be added.

In operation 912, the electronic device 901 may wirelessly output a ping signal every first period through a coil (e.g., the transmission coil 311L of FIG. 3 or the transmission coil 411L of FIG. 4) by using a power transmission circuit (e.g., the power transmission circuit 311 of FIG. 3). For example, the electronic device 901 may wirelessly output a ping signal (e.g., an analog signal of a first frequency (e.g., 148 kHz) or a digital signal of the first period) every designated period (e.g., the first period (e.g., 550 ms)) through the transmission coil 311L by using the power transmission circuit 311.

In operation 914, the electronic device 901 according to an embodiment of the disclosure may change a ping signal period based on the detection value of the ping signal. For example, the electronic device 901 may identify a change value of the output ping signal, by using a detection circuit (e.g., the sensing circuit 314 of FIG. 3). For example, the electronic device 901 may identify a current detection value of the changed ping signal or a voltage detection value of the output ping signal. The electronic device 901 may detect the current value of the changed ping signal by using the detection circuit when outputting the ping signal, and change the period of the ping signal from the first period into the second period (e.g., 2000 ms) longer than the first period, when the detection value exceeds the first current threshold value. For example, the electronic device 901 may detect the voltage value of the changed ping signal, by using the detection circuit when outputting the ping signal, and change the period of the ping signal from the first period into the second period (e.g., 2000 ms) longer than the first period, when the detection value exceeds the first voltage threshold value. According to an embodiment of the disclosure, the electronic device 901 may detect a value of a ping signal a plurality of times every designated time interval (e.g., an interval of 1 ms) and identify (or monitor) a plurality of detection values (a plurality of current detection values or a plurality of voltage detection values), such that when the plurality of detection values exceed the first threshold value (the first current threshold value or the first voltage threshold value) n times or more (e.g., three times), the electronic device 901 may change a period of the ping signal from the first period to the second period (e.g., 2000 ms) longer than the first period. According to an embodiment of the disclosure, the electronic device 901 may determine (or identify) that the foreign object (a substance) exists in the position corresponding to the transmission coil (e.g., the position on the charging pad where the external electronic device is placed), upon failing to receive the response signal from the external electronic device 902 when the value of the changed ping signal exceeds the first threshold value.

In operation 916, the electronic device 901 according to an embodiment of the disclosure may maintain or change a threshold value related to stop of wireless power transmission, upon failing to receive the response signal from the external electronic device when the detection value of the ping signal exceeds the first threshold value.

According to various embodiments of the disclosure, the electronic device 901 may maintain or change the threshold value related to stop of output of the power signal for wireless power transmission, based on the ping signal output period. According to various embodiments of the disclosure, the threshold value related to stop of wireless power transmission may be a threshold value for stopping wireless power transmission, when the power signal is wirelessly output to the external electronic device. According to various embodiments of the disclosure, the threshold value related to stop of output of the power signal for wireless power transmission may be an FOD threshold value. For example, the FOD threshold value may be a threshold value of a difference between a transmission power transmitted from the electronic device 901 and a reception power received by the external electronic device 902. The FOD threshold value may be designated to (or changed into) one of a plurality of threshold values (e.g., a second threshold value, a third threshold value, a fourth threshold value, or a fifth threshold value) based on power transmission/reception characteristics (e.g., a ping signal period or a charging mode) of the power transmission device 301 and the power reception device 302.

According to various embodiments of the disclosure, the electronic device 901 may change the FOD threshold value from the second threshold value to the third threshold value that is less than the second threshold value, upon failing to receive the response signal from the external electronic device when the detection value of the ping signal exceeds the first threshold value. For example, the FOD threshold value may be the second threshold value (e.g., 1300 mW) when the ping signal has a first period (550 ms) and the charging mode is a normal charging mode, and the FOD threshold value may be the third threshold value (e.g., 560 mW) when the ping signal has a second period (2000 ms) and the charging mode is the normal charging mode.

In operation 918, the electronic device 901 according to an embodiment of the disclosure may receive an SSP signal transmitted from the external electronic device 902 as the external electronic device 902 receives the ping signal of the second period.

The electronic device 901 according to an embodiment of the disclosure may receive identification & configuration information from the external electronic device 902 in operation 920, and perform identification and authentication with respect to the external electronic device 902 in operation 922.

In operations 924 through 928, the electronic device 901 according to an embodiment of the disclosure and the external electronic device 902 may set the charging mode. In operation 924, the electronic device 901 according to an embodiment of the disclosure may receive request Tx identification from the external electronic device 902. According to an embodiment of the disclosure, the request Tx identification may be a signal requesting Tx identification (e.g., identification information of a transmitting electronic device (e.g., 901). In operation 926, the electronic device 901 according to an embodiment of the disclosure may transmit the Tx identification. According to various embodiments of the disclosure, the Tx identification may include a transmission voltage, a power value, a frequency, and a parameter value for power transmission. For example, the Tx identification may include charging mode information (e.g., the normal charging mode or the high-speed charging mode) supportable by the electronic device 901. For example, the Tx identification may include information of the first power signal (e.g., the first power magnitude/level (e.g., the first voltage magnitude, the first current magnitude, or 5v)) provided corresponding to the normal charging mode when the normal charging mode is supported. For example, the Tx identification may include information of the second power signal (e.g., the second power magnitude/level greater than the first voltage (e.g., the first voltage magnitude, the first current magnitude, or 9v)) provided corresponding to the high-speed charging mode when the high-speed charging mode is supported. In operation 928, the electronic device 901 according to an embodiment of the disclosure may receive Ack (set tx mode) responding to the Tx identification from the external electronic device 902. For example, Ack (set tx mode) may include information indicating that the charging mode is set based on the transmission voltage, the power value, the frequency, and the parameter value for power transfer. For example, Ack (set tx mode) may include information indicating that the normal charging mode or the high-speed charging mode is set. According to an embodiment of the disclosure, some of operations 924 through 928 may be omitted, or operations 924 through 928 may be performed through operation 920 or in another operation.

In operation 930, the electronic device 901 according to an embodiment of the disclosure may identify or change a magnitude of a power signal for wireless power transmission based on the charging mode. For example, in the high-speed charging mode, the electronic device 901 may identify or change the second power magnitude/level designated corresponding to high-speed charging as or into the third power magnitude/level that is less than the second power magnitude/level. According to various embodiments of the disclosure, when the electronic device 901 operates in the high-speed charging mode in case of the ping signal of the second period, the electronic device 901 may identify or change the FOD threshold value as or into the fifth threshold value corresponding to the high-speed charging mode and the ping signal of the second period. According to various embodiments of the disclosure, the FOD threshold value may be the fourth threshold value (e.g., 2600 mW) when the ping signal has the first period (550 ms) and the charging mode is the high-speed charging mode, and the FOD threshold value may be the fifth threshold value (e.g., 1300 mW) when the ping signal has the second period (2000 ms) and the charging mode is the high-speed charging mode.

In operation 932, the electronic device 901 according to an embodiment of the disclosure may transmit the power signal based on the identified or changed power magnitude/level. For example, the electronic device 901 may transmit the third power signal of the third power magnitude/level in the high-speed charging mode.

In operation 934, the electronic device 901 according to an embodiment of the disclosure may identify whether to stop wireless power transmission based on the detection value of the power signal. For example, the electronic device 901 may detect a change of the power signal (e.g., current or voltage flowing through a coil or a power transmission circuit) during power signal transmission, and identify whether to stop outputting the power signal based on whether a detection value of the changed power signal exceeds a threshold value (e.g., the FOD threshold value) related to stop of wireless power transmission. The electronic device 901 may transmit a power signal (e.g., a CEP signal), receive power information (e.g., an RRP signal) received from the external electronic device 902 to identify a difference between a transmission power and a reception power, and identify whether to stop outputting the power signal by identifying whether the difference between the transmission power and the reception power exceeds the FOD threshold value (e.g., the second threshold value, the third threshold value, the fourth threshold value, or the fifth threshold value).

The electronic device 901 according to various embodiments of the disclosure may identify presence or absence of a foreign object, based on the detection value of the ping signal or/and the detection value of the power signal (e.g., current or voltage flowing through the coil or the power transmission circuit) and at least one of the first threshold value, the second threshold value, the third threshold value, the fourth threshold value, or/and the fifth threshold value. According to an embodiment of the disclosure, the electronic device 901 may determine (or identify) that the foreign object exists, upon failing to receive the response signal from the external electronic device 902, when the detection value of the ping signal exceeds the first threshold value. According to an embodiment of the disclosure, the electronic device 901 may determine (or identify) that the foreign object exists, when power is transmitted in a state where the detection value of the ping signal from the external electronic device 902 exceeds the first threshold value and the period of the ping signal is changed into the second period, such that the detection value of the power signal exceeds the second threshold value, the third threshold value, the fourth threshold value, and/or the fifth threshold value. According to various embodiments of the disclosure, the electronic device 901 may detect a change of the power signal during power signal transmission when determining based on the first threshold value that the foreign object exists, and identify whether to stop wireless power transmission or lower a transmission power according to an FOD state (e.g., a power change state corresponding to the foreign object) based on the second threshold value, the third threshold value, the fourth threshold, or the fifth threshold value.

In operation 936, the electronic device 901 according to an embodiment of the disclosure may continue or stop power signal transmission based on whether wireless power transmission is stopped. For example, the electronic device 901 may continue power signal transmission when the detection value of the changed power signal is less than or equal to the threshold value related to stop of wireless power transmission (e.g., the second threshold value, the third threshold value, the fourth threshold value, or the fifth threshold value) during power signal transmission and may stop outputting the power signal when the detection value of the changed power signal exceeds the threshold value related to stop of wireless power transmission (e.g., the second threshold value, the third threshold value, the fourth threshold value, or the fifth threshold value) during power signal transmission.

Figure 10A:
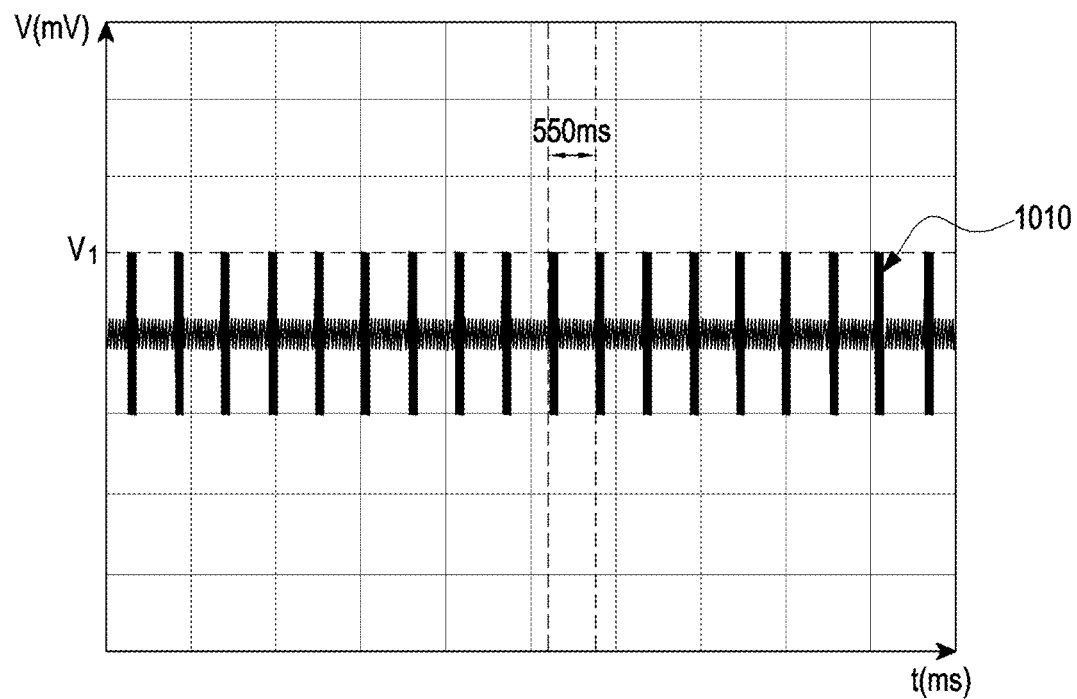
FIGS. 10A and 10B illustrate a ping signal period according to various embodiments.
Figure 10B:
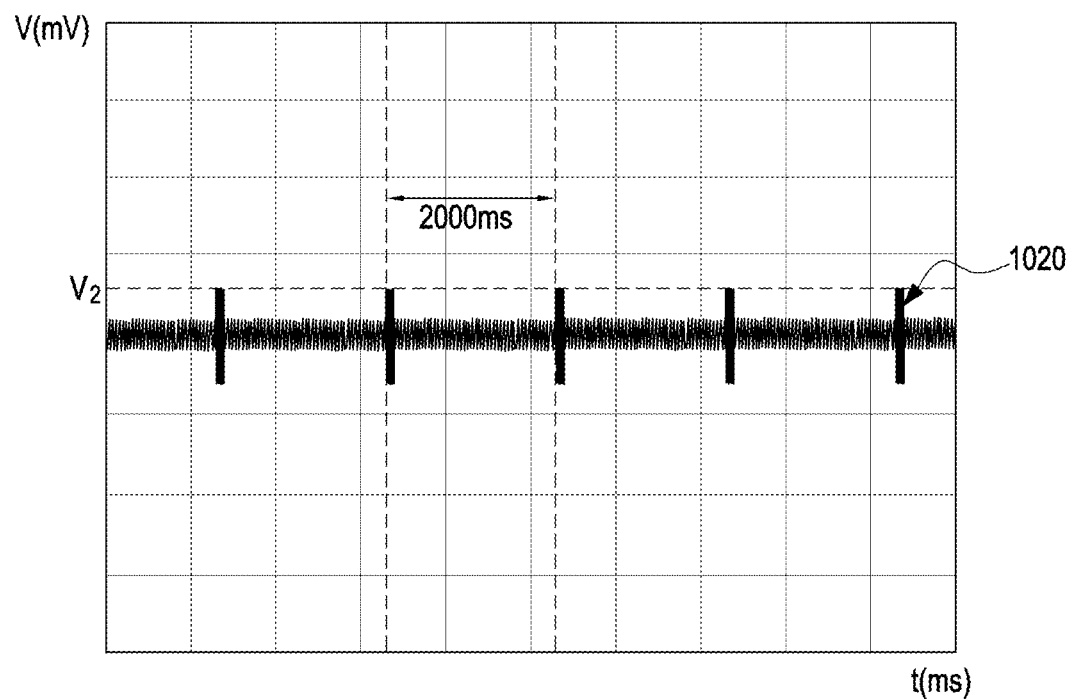

FIGS. 10A and 10B illustrate a ping signal period according to various embodiments.

Referring to FIG. 10A, an electronic device (e.g., the electronic device 101 of FIG. 1, the power transmission device 301 of FIG. 3, the power transmission device 501 of FIG. 5, or the electronic device 901 of FIG. 9) according to an embodiment of the disclosure may wirelessly output a ping signal 1010 of the first period. For example, the electronic device 901 may wirelessly output a signal of a first frequency (e.g., 148 kHz) every 550 ms through a transmission coil (e.g., the transmission coil 311L of FIG. 3) by using a power transmission circuit (e.g., the power transmission circuit 311 of FIG. 3).

Referring to FIG. 10B, an electronic device (e.g., the electronic device 101 of FIG. 1, the power transmission device 301 of FIG. 3, the power transmission device 501 of FIG. 5, or the electronic device 901 of FIG. 9) according to an embodiment of the disclosure may wirelessly output a ping signal 1020 of the second period. For example, the electronic device 901 may wirelessly output a signal of a second frequency (e.g., a frequency lower than 148 kHz) every 2000 ms through a transmission coil (e.g., the transmission coil 311L of FIG. 3) by using a power transmission circuit (e.g., the power transmission circuit 311 of FIG. 3).

FIG. 11 illustrates temperature change around a transmission coil with respect to a ping signal period, according to various embodiments.

Referring to FIG. 11, a foreign object 1110 (e.g., a circular metal body having a diameter of several centimeters) may be placed in a position corresponding to a transmission coil (e.g., the transmission coil 311L of FIG. 3 or the transmission coil 411L of FIG. 4) or a periphery 1100 of the transmission coil (e.g., the position on the charging pad where the external electronic device is placed).

Figures 11A, 11B:
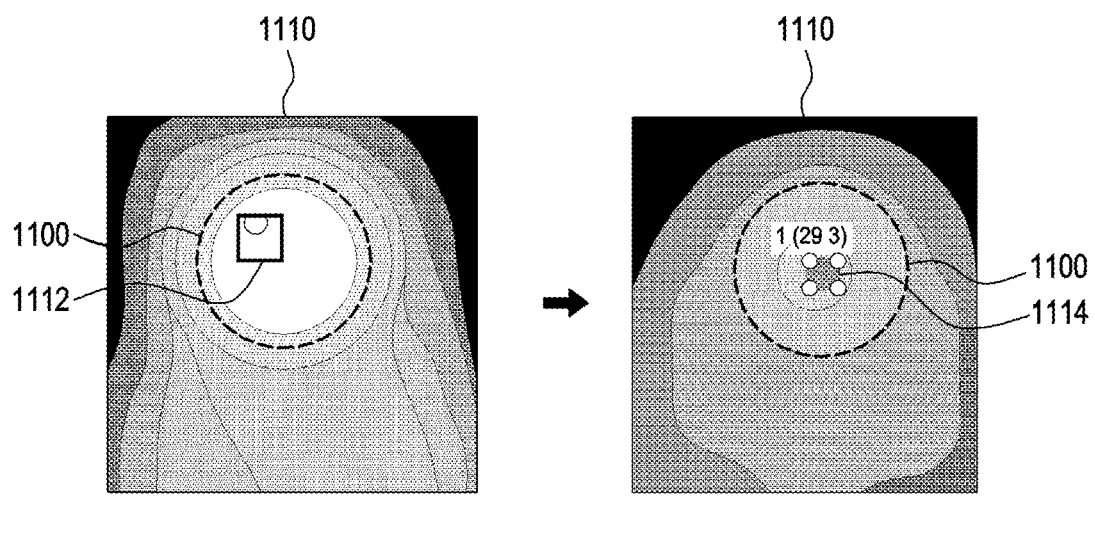
FIGS. 11A and 11B illustrate temperature change around a transmission coil with respect to a ping signal period, according to various embodiments.

Referring to FIG. 11A, when a ping signal of a first period (e.g., 550 ms) is output, a temperature in a position corresponding to a transmission coil (e.g., the transmission coil 311L of FIG. 3 or the transmission coil 411L of FIG. 4) or in a part 1112 of the periphery of the transmission coil may be about 67.1 degrees.

Referring to FIG. 11B, when the first period is changed into the second period such that the ping signal of the second period (e.g., 2000 ms) is output, a temperature in a position corresponding to a transmission coil (e.g., the transmission coil 311L of FIG. 3 or the transmission coil 411L of FIG. 4) or in a part 1114 of the periphery of the transmission coil may be about 29.3 degrees.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

According to various embodiments of the disclosure, in a storage medium having stored therein instructions, the instructions may be configured to, when executed by at least one circuit, cause the at least one circuit to perform at least one operation including wirelessly outputting a first signal for identifying an access of a foreign object by first period intervals (or every first periods) through the coil (or periodically output the first signal by a first period), by using a power transmission circuit, identifying a change of the first signal, by using a detection circuit, wirelessly outputting the first signal by the first period intervals, when a detection value of the changed first signal is less than or equal to a first threshold value, and wirelessly outputting the first signal by a second period intervals longer than the first period intervals, when the detection value of the changed first signal exceeds the first threshold value.

According to various embodiments of the disclosure, the at least one operation may further include changing a second threshold value related to stop of wireless power transmission, when a detection value of the changed first signal exceeds the first threshold value, receiving a response signal corresponding to the first signal for identifying the access of the foreign object from an external electronic device, through a communication circuit, transmitting a second signal for wireless power transmission through the power transmission circuit, upon receiving the response signal, identifying a change of the second signal, by using the detection circuit, and stopping wireless power transmission, when a detection value of the changed second signal exceeds a second threshold value related to stop of the wireless power transmission.

The computer readable recording medium may include a hard disk, a floppy disk, or magnetic media (e.g., a magnetic tape, optical media (e.g., compact disc read only memory (CD-ROM) or digital versatile disc (DVD)), magneto-optical media (e.g., floptical disk), a hardware device (e.g., ROM, RAM, flash memory, etc.)), and so forth. Further, the program instructions may include a machine language code created by a compiler and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

The electronic device according to various embodiments of the present disclosure is not limited by the above-described embodiments and drawings, and it would be apparent to those of ordinary skill in the art that various substitutions, modifications, and changes in the technical scope of the present disclosure may be possible.

According to various embodiments of the disclosure, the electronic device may reduce heat production caused by a foreign object by monitoring standby power before transmission of actual power to be transmitted from an external electronic device.

According to various embodiments of the disclosure, the electronic device may reduce heat generation caused by a foreign object by changing a ping period when the foreign object exists as a result of standby power monitoring in a ping signal output state.

According to various embodiments of the disclosure, the electronic device may allow power supply to be flexibly stopped by lowering a threshold value related to stop of wireless power transmission in an actual power transfer phase (e.g., a power transfer phase) while enabling wireless power transmission even when a foreign object exists as a result of standby power monitoring.

According to various embodiments of the disclosure, heat generation may be minimized by lowering a transmission power magnitude designated in relation to a high-speed charging mode even in the presence of a foreign object as a result of standby power monitoring.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a coil;
    a power transmission circuit electrically connected with the coil;
    a detection circuit; and
    a control circuit,
    wherein the control circuit is configured to:
        wirelessly output a first signal for identifying an access of a foreign object by first period intervals through the coil using the power transmission circuit;
        identify a change of the first signal using the detection circuit;
        wirelessly output the first signal by the first period intervals in response to a detection value of the change of the first signal being less than or equal to a first threshold value; and
        wirelessly output the first signal by a second period intervals longer than the first period intervals in response to the detection value of the change of the first signal exceeding the first threshold value.

2. The electronic device of claim 1, wherein the first signal for identifying the access of the foreign object comprises a ping signal.

3. The electronic device of claim 1, further comprising a communication circuit,
    wherein the control circuit is further configured to:
        transmit a second signal for wireless power transmission through the power transmission circuit, upon receiving a response signal corresponding to the first signal from an external electronic device, through the communication circuit;
        identify a change of the second signal using the detection circuit; and
        stop the wireless power transmission in response to a detection value of the change of the second signal exceeding a threshold value related to stop of the wireless power transmission.

4. The electronic device of claim 3, wherein the control circuit is further configured to change the threshold value related to stop of the wireless power transmission in response to the detection value of the change of the first signal exceeding the first threshold value.

5. The electronic device of claim 4, wherein, in response to the detection value of the change of the first signal exceeding the first threshold value, the control circuit is further configured to:
    change a second threshold value related to stop of wireless power transmission into a third threshold value in a normal charging mode, the third threshold value being less than the second threshold value; and
    change a fourth threshold value related to stop of wireless power transmission into a fifth threshold value in a high-speed charging mode, the fifth threshold value being less than the fourth threshold value.

6. The electronic device of claim 3, wherein the control circuit is further configured to:
    identify a charging mode upon receiving a response signal corresponding to the first signal from the external electronic device;
    transmit the second signal with a first power magnitude designated corresponding to a normal charging mode in response to the identified charging mode being the normal charging mode; and
    transmit the second signal with a second power magnitude that is designated corresponding to a high-speed charging mode in response to the identified charging mode being the high-speed charging mode, the second power magnitude being greater than the first power magnitude.

7. The electronic device of claim 6, wherein, in response to the first period intervals being changed into the second period intervals, the control circuit is further configured to:
change a power magnitude designated corresponding to the high-speed charging mode into a third power magnitude, the third power magnitude being less than the second power magnitude; and
transmit the second signal with the third power magnitude in the high-speed charging mode.

8. The electronic device of claim 7, wherein the control circuit is further configured to transmit to the external electronic device, through the communication circuit, information indicating that the second signal is transmitted with the third power magnitude while transmitting the second signal with the third power magnitude.

9. An electronic device comprising:
a coil;
a power transmission circuit electrically connected with the coil;
a detection circuit; and
a control circuit,
wherein the control circuit is configured to:
wirelessly output a ping signal by first period intervals through the coil using the power transmission circuit;
identify presence or absence of a foreign object based on a change of the ping signal, the change of the ping signal detected using the detection circuit;
change, based on the change of the ping signal, a magnitude of a power signal wirelessly transmitted to an external electronic device based on the presence or absence of the foreign object; and
transmit the power signal with the changed magnitude through the power transmission circuit upon receiving a response signal corresponding to the ping signal from the external electronic device.

10. The electronic device of claim 9, wherein the control circuit is further configured to:
wirelessly output a first signal by the first period intervals in response to a detection value of the change of the ping signal being less than or equal to a first threshold value, the detection value of the change of the ping signal being made by the detection circuit;
change the first period intervals into a second period intervals, the second period intervals being longer than the first period intervals; and
identify the presence or absence of the foreign object in response to the detection value of the change of the ping signal exceeding the first threshold value.

11. The electronic device of claim 10, wherein the control circuit is further configured to change the first threshold value related to stop of wireless power transmission in response to the detection value of the change of the ping signal exceeding the first threshold value.

12. The electronic device of claim 11, wherein, in response to the detection value of the change of the ping signal exceeding the first threshold value, the control circuit is further configured to:
change a second threshold value related to stop of wireless power transmission into a third threshold value in a normal charging mode, the third threshold value being less than the second threshold value; and
change a fourth threshold value related to stop of wireless power transmission into a fifth threshold value in a high-speed charging mode, the fifth threshold value being less than the fourth threshold value.

13. The electronic device of claim 10, wherein the control circuit is further configured to:
identify a charging mode upon receiving a response signal corresponding to the ping signal;
transmit a first power signal of a first magnitude designated corresponding to a normal charging mode in response to the identified charging mode being the normal charging mode; and
transmit a second power signal of a second magnitude that is designated corresponding to a high-speed charging mode in response to the identified charging mode being the high-speed charging mode, the second magnitude being greater than the first magnitude.

14. The electronic device of claim 13, wherein, in response to the foreign object existing, the control circuit is further configured to:
change the second magnitude designated corresponding to the high-speed charging mode into a third magnitude, the third magnitude being less than the second magnitude;
transmit a third signal of the third magnitude in the high-speed charging mode; and
transmit, to the external electronic device, information indicating that a second signal is transmitted with the third magnitude through a communication circuit.

15. A method for wirelessly transmitting power based on foreign object detection in an electronic device, the method comprising:
wirelessly outputting a first signal for identifying an access of a foreign object by first period intervals through a coil using a power transmission circuit;
identifying a change of the first signal using a detection circuit; and
controlling the power transmission circuit based on a detection value of the change of the first signal,
wherein, in response to a detection value of the change of the first signal being less than or equal to a first threshold value, controlling the power transmission circuit to maintain wirelessly outputting the first signal by the first period intervals, and
wherein, in response to a detection value of the change of the first signal exceeding the first threshold value, controlling the power transmission circuit to wirelessly output the first signal by a second period intervals, the second period intervals being longer than the first period intervals.

16. The method of claim 15, wherein the first signal for identifying the access of the foreign object comprises a ping signal.

17. The method of claim 16, further comprising:
receiving a response signal corresponding to the first signal for identifying the access of the foreign object from an external electronic device through a communication circuit;
transmitting a second signal for wireless power transmission through the power transmission circuit upon receiving the response signal;
identifying a change of the second signal using the detection circuit; and
stopping wireless power transmission in response to a detection value of the change of the second signal exceeding a threshold value related to stop of the wireless power transmission.

18. The method of claim 17, further comprising changing the threshold value related to stop of the wireless power transmission in response to the detection value of the change of the first signal exceeding the first threshold value,
  wherein the changing of the threshold value related to stop of the wireless power transmission comprises:
    changing a second threshold value related to stop of wireless power transmission into a third threshold value in a normal charging mode, the third threshold value being less than the second threshold value; and
    changing a fourth threshold value related to stop of wireless power transmission into a fifth threshold value in a high-speed charging mode, the fifth threshold value being less than the fourth threshold value.

19. The method of claim 17, further comprising:
  identifying a charging mode upon receiving a response signal corresponding to the first signal for identifying the access of the foreign object from the external electronic device;
  transmitting a first power signal of a first power magnitude designated corresponding to a normal charging mode in response to the identified charging mode being the normal charging mode; and
  transmitting a second power signal of a second power magnitude designated corresponding to a high-speed charging mode in response to the identified charging mode being the high-speed charging mode.

20. The method of claim 19, wherein in response to the first period intervals being changed into the second period intervals, the method further comprises:
  changing the second power magnitude designated corresponding to the high-speed charging mode into a third power magnitude, the third power magnitude being less than the second power magnitude;
  transmitting a third power signal of the third power magnitude in the high-speed charging mode; and
  transmitting, to the external electronic device, information indicating that the second signal is transmitted with the third power magnitude through the communication circuit.

* * * * *